(12) United States Patent
Wang

(10) Patent No.: US 9,681,523 B2
(45) Date of Patent: *Jun. 13, 2017

(54) MULTIFUNCTION LIGHT CONTROLLER EQUIPPED WITH LOCALIZED CONTROL

(71) Applicant: Jessica Wang, Taipei (TW)

(72) Inventor: Jessica Wang, Taipei (TW)

(*) Notice: Subject to any disclaimer, the term of this patent is extended or adjusted under 35 U.S.C. 154(b) by 271 days.

This patent is subject to a terminal disclaimer.

(21) Appl. No.: 14/210,005

(22) Filed: Mar. 13, 2014

(65) Prior Publication Data

US 2014/0335910 A1   Nov. 13, 2014

Related U.S. Application Data

(60) Provisional application No. 61/785,967, filed on Mar. 14, 2013.

(51) Int. Cl.
| | | |
|---|---|---|
| *H05B 37/00* | (2006.01) | |
| *H05B 37/02* | (2006.01) | |
| *H04R 3/00* | (2006.01) | |
| *H04M 1/725* | (2006.01) | |

(52) U.S. Cl.
CPC .... *H05B 37/0272* (2013.01); *H04M 1/72533* (2013.01); *H04R 3/00* (2013.01); *H05B 37/029* (2013.01); *H05B 37/0281* (2013.01); *H04M 2250/02* (2013.01); *H04R 2420/07* (2013.01); *Y02B 20/42* (2013.01); *Y02B 20/48* (2013.01)

(58) Field of Classification Search
USPC ............... 315/185 R, 185 S, 200 A; 700/83; 381/61, 124
See application file for complete search history.

(56) References Cited

U.S. PATENT DOCUMENTS

| | | | | | |
|---|---|---|---|---|---|
| 5,629,587 | A * | 5/1997 | Gray | ............... | H05B 37/029 315/292 |
| 5,632,550 | A * | 5/1997 | Yeh | ............... | H05B 33/0803 362/123 |
| 6,424,096 | B1 * | 7/2002 | Lowe | ............... | H05B 37/0272 315/185 R |
| 6,995,525 | B2 * | 2/2006 | Barthelmess | ............... | H05B 37/029 315/152 |

(Continued)

*Primary Examiner* — Thuy Vinh Tran
(74) *Attorney, Agent, or Firm* — Seed Intellectual Property Law Group LLP

(57) ABSTRACT

An apparatus and method allow end users to interactively create complex lighting patterns by remote control. Applications include decorative lighting, landscape lighting, signage, or advertising platforms. A lighting control system can be equipped with sensors that can receive remote control signals from a variety of different sources, and route the control signals to modulate receptacles coupled to different lighting circuits, thereby independently controlling multiple light arrays to achieve separate light patterns, or to coordinate different lighting effects. The control signals can independently energize localized groups of lamps to provide enhanced lighting effects, while using significantly less wire material. Interactive remote control can be provided via a mobile computing device such as a smart phone running a customized program. In one embodiment, the remote control device communicates selections to a Bluetooth®-equipped speaker to produce sound-controlled lighting effects.

13 Claims, 19 Drawing Sheets

(56) References Cited

U.S. PATENT DOCUMENTS

| | | | | |
|---|---|---|---|---|
| 7,175,302 | B2* | 2/2007 | Kazar | H05B 37/029 307/12 |
| 7,202,607 | B2* | 4/2007 | Kazar | H05B 37/029 315/185 S |
| 7,728,216 | B2 | 6/2010 | Hermanson et al. | |
| 8,779,265 | B1 | 7/2014 | Gottlieb | |
| 9,173,443 | B2* | 11/2015 | Loomis | A41G 1/005 |
| 2002/0057061 | A1 | 5/2002 | Mueller et al. | |
| 2002/0161462 | A1* | 10/2002 | Fay | A63F 13/10 700/94 |
| 2004/0001601 | A1* | 1/2004 | Wang | H04R 3/14 381/124 |
| 2006/0023454 | A1 | 2/2006 | Koren | |
| 2008/0111498 | A1* | 5/2008 | Budike | H05B 37/0272 315/291 |
| 2008/0143267 | A1* | 6/2008 | Neuman | H05B 37/0281 315/192 |
| 2010/0271802 | A1 | 10/2010 | Recker et al. | |
| 2013/0063042 | A1 | 3/2013 | Bora et al. | |

* cited by examiner

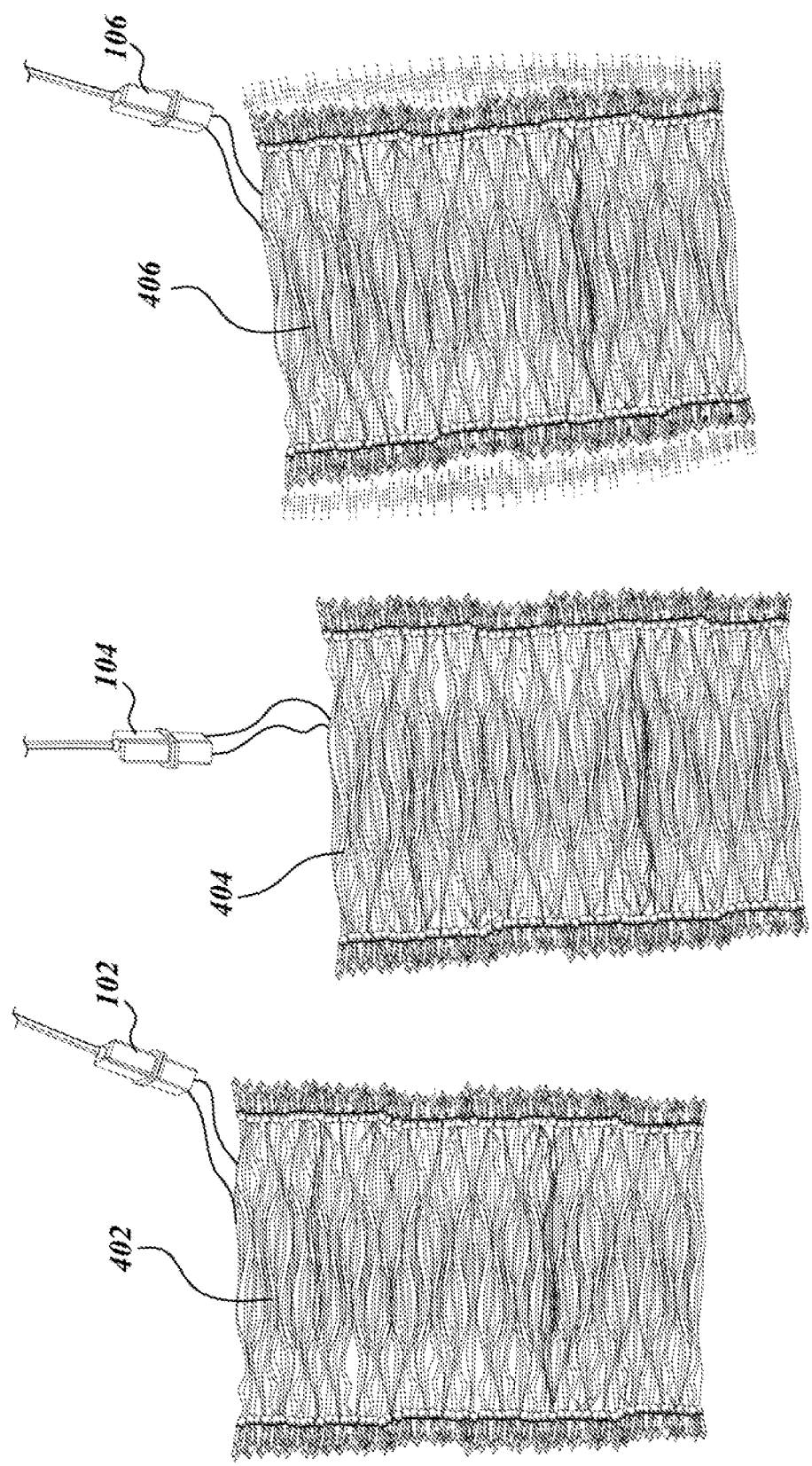

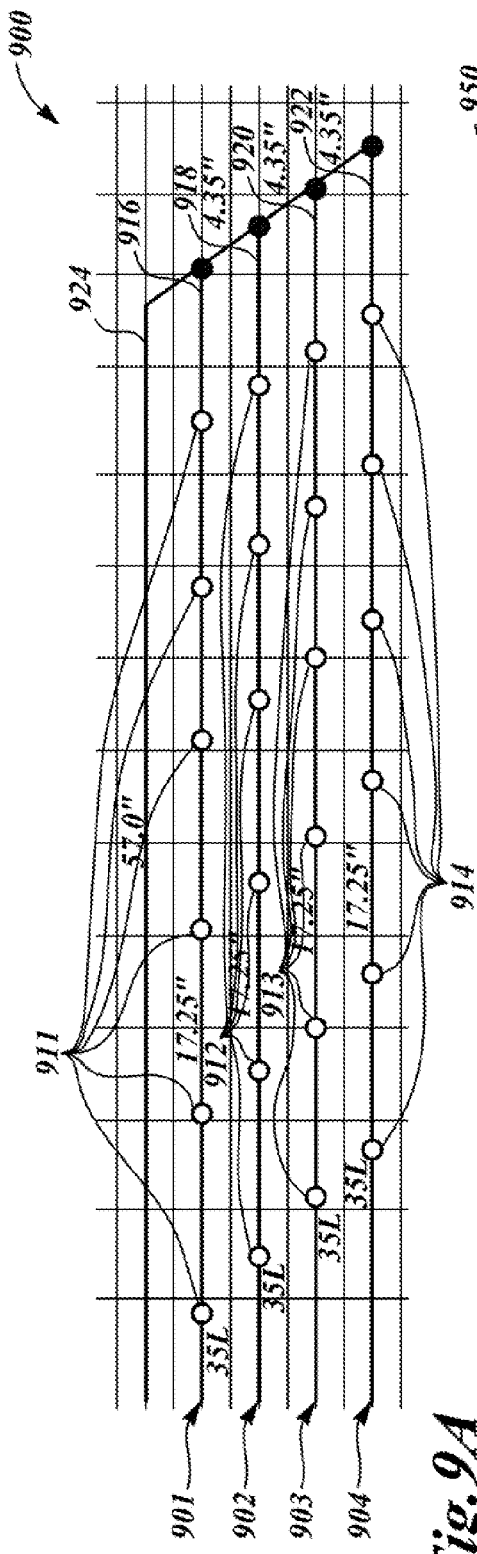
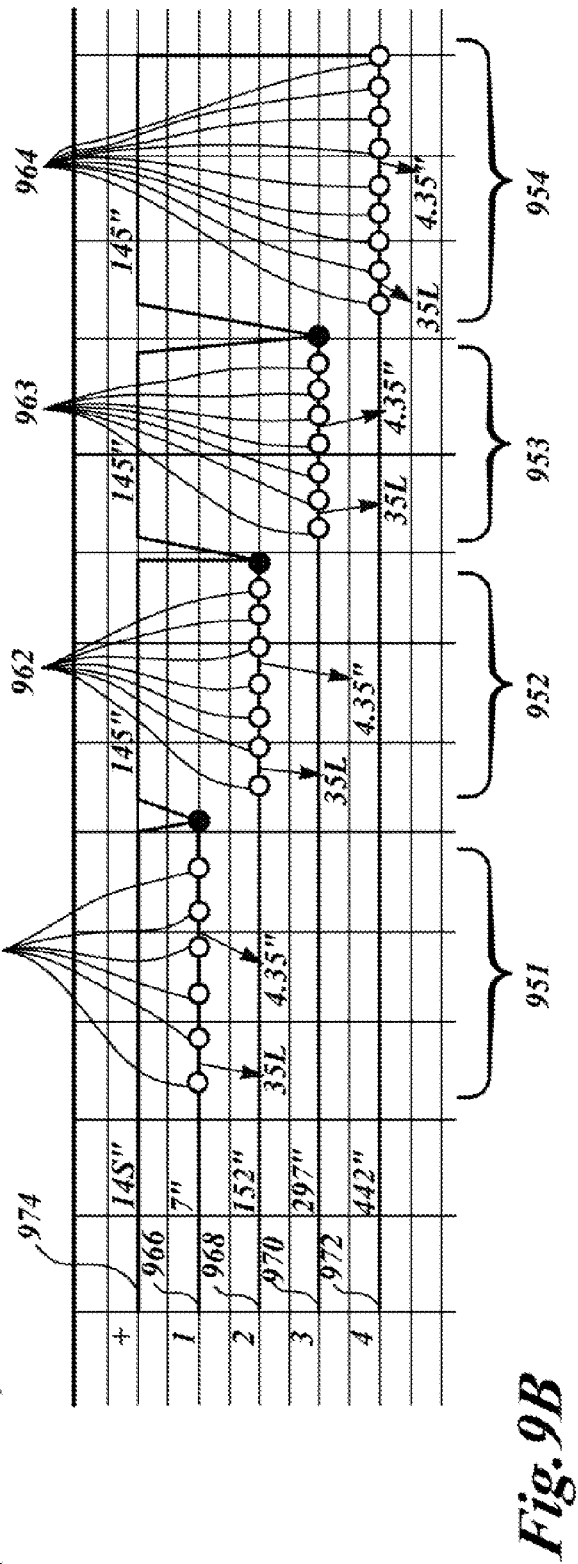
Fig. 9A (PRIOR ART)
Fig. 9B

MULTIFUNCTION LIGHT CONTROLLER EQUIPPED WITH LOCALIZED CONTROL

RELATED APPLICATION

This patent application claims benefit under 35 U.S.C. §119(e) of U.S. Provisional Patent Application No. 61/785,967, filed on Mar. 14, 2013, which is hereby incorporated by reference in its entirety

BACKGROUND

Technical Field

The present disclosure pertains to control of lighting systems and devices, and more specifically, to various control modes for creating decorative light patterns.

Description of the Related Art

The lighting industry is experiencing a renaissance, driven partly by the proliferation of lower power LED light sources, and the application of digital controllers to such low-power lighting systems. It is now possible to fine tune the color, brightness, and timing of lighting arrangements with great accuracy, thus offering a variety of lighting design choices that has not been possible in the past.

By way of illustration, decorative lighting elements (e.g., strands of holiday lights such as Christmas lights) historically were caused to blink on and off by intermittently including in a lighting circuit a high-value resistor, thus blocking current flow downstream to the string of light bulbs. This was accomplished by hard-wiring a "special" control bulb into the circuit that was pre-set to switch on and off at a certain frequency. Such a lighting system is an example of a non-user-programmable system because (a) the only decorative effect option is "blinking" (b) the user must choose between "always blinking" and "never blinking," by either installing the special bulb or not, and (c) the blinking frequency is fixed, not adjustable.

An alternative way to create light patterns using a light array is to directly control the power at an outlet receptacle. Thus, instead of varying the load voltage or load current locally within the circuit, the power supply itself can be varied via a hard-wired or a pre-programmed control signal. A power control signal may be supplied by, for example, a programmable controller. The controller can be programmed using an EPROM (electrically programmable read-only memory), or a similar programmable integrated circuit chip, to cycle through a prescribed set of signals to produce a sequence of light patterns. Or, the controller can modulate the power supply according to an input signal from another device so that, for example, light patterns can be created in response to sounds or musical rhythms while music is played simultaneously from a radio or a playback device. (see U.S. Pat. No. 7,728,216).

What is needed is an apparatus that removes limitations of existing pre-programmed or hard-wired lighting system controllers in order to offer better control of advanced creative lighting features to end users such as individual consumers, businesses, advertising entities, and the like.

BRIEF SUMMARY

The apparatus and method disclosed permit end users to create complex light patterns by remote control. The end user has the freedom to control a multi-functional lighting system by creating a customized program, modifying a set of pre-programmed instructions, or interactively customizing light patterns in real time. According to one embodiment, one or more light arrays can be independently modulated by separate control signals. Such a lighting control system can also be equipped with sensors that can receive remote control signals from a variety of different sources, and route the control signals to modulate, for example, the power supplied to different lighting circuits, thereby independently controlling multiple light arrays to achieve separate effects, or to coordinate different lighting effects.

BRIEF DESCRIPTION OF THE SEVERAL VIEWS OF THE DRAWINGS

FIGS. 4A-4C are pictorial views of three light arrays being independently activated within a multi-function lighting display apparatus, according to a non-limiting illustrative embodiment.

FIGS. 9A and 9B are circuit diagrams showing a comparison between conventional (prior art) and new decorative light array configurations.

DETAILED DESCRIPTION

Figure 1:
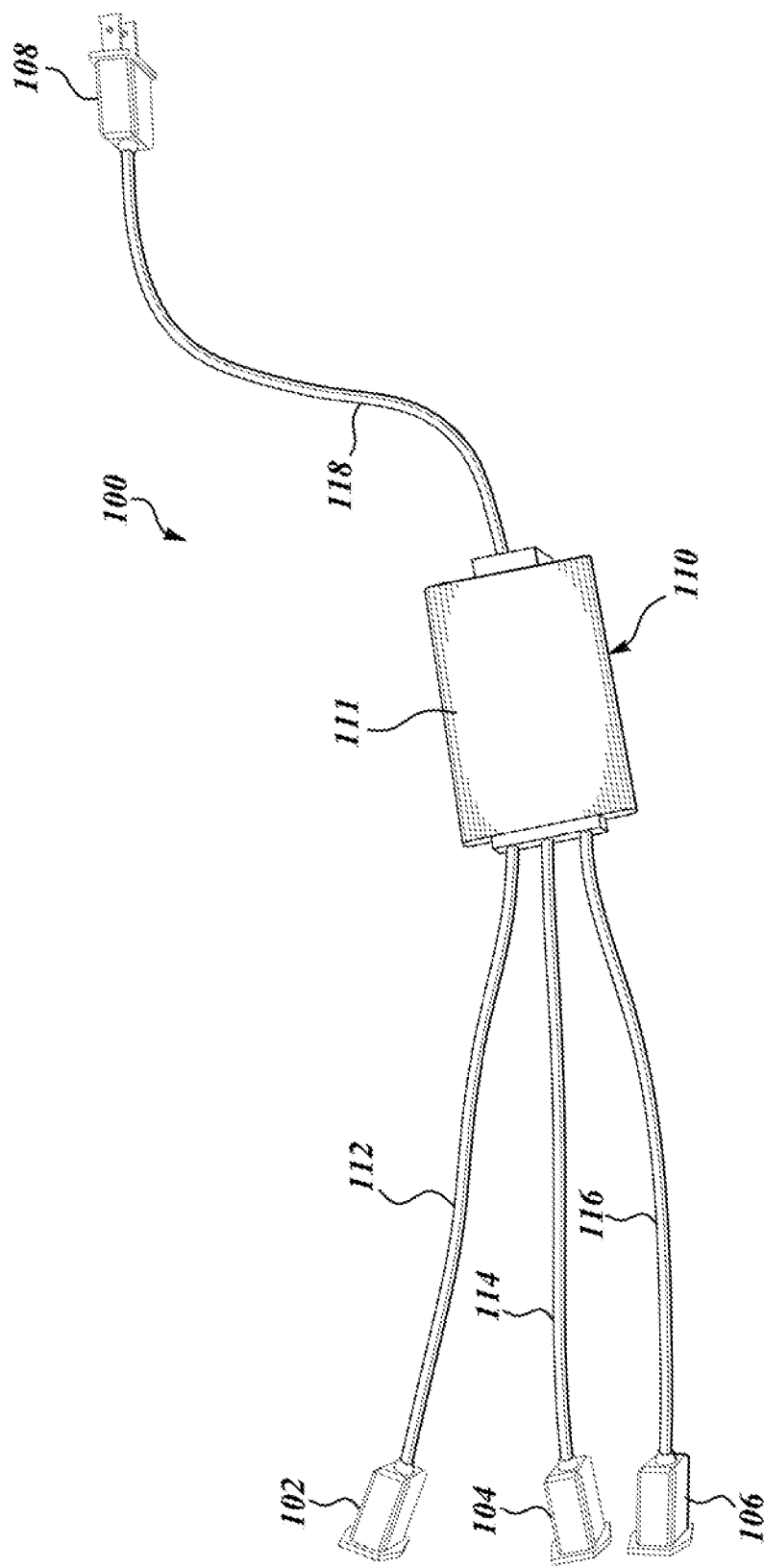
FIG. 1 is a pictorial view of a multi-function lighting display apparatus that includes a controller and three receptacles, according to a non-limiting illustrative embodiment.

FIG. 1 shows one embodiment of a basic multi-function lighting display apparatus 100. The lighting display apparatus 100 includes one or more (female) electric receptacles 102, 104, and 106, a (male) power source plug 108, and a controller 110 having a controller housing 111. The power source plug can be fashioned according to an ordinary UL plug design. The receptacles can also be fashioned according to commonly-used standards for low-power lighting, for example, having an electrical current rating of 1.6 Amps. The receptacle 102 is coupled to the controller 110 by a connector 112; the receptacle 104 is coupled to the controller 110 by a connector 114; and the receptacle 106 is coupled to the controller 110 by a connector 116. The power source plug 108 likewise is coupled to the controller 110 by a source power connector 118. The power source plug 108 is also coupled to an electric power grid to supply each of the power receptacles 102, 104, 106. The power source plug 108 can connect, for example, directly to a 120 V/60 A wall outlet. Other embodiments can substitute alternative power sources for the power grid such as, for example, a source of solar energy.

According to the embodiment shown in FIG. 1, the receptacles 102, 104, and 106 are power receptacles and the connectors 112, 114, 116, and 118 are power cord wires (e.g., 18 gauge double-ply wire), the power connector 118 measuring about 24-60 inches long while the three power connectors 112, 114, and 116 are each shorter, about 6-12 inches long. However, other embodiments are not so limited. For example, miniaturized power connectors 112, 114, 116, and 118 can be located inside the controller housing 111, and the receptacles 102, 104, and 106 can be mounted on the outside of the controller housing 111 to provide a more compact form factor for the overall lighting display apparatus 100. The form factor of the controller 110 shown in FIG. 1, however, is designed to keep the size of the controller 110 small and lightweight.

In an exemplary embodiment, the controller 110 is electrically coupled between the source power connector 118 and the power connectors 112, 114, 116 so as to modulate the electric power delivered to each of the receptacles 102, 104, and 106. The controller 110 is generally a device that includes electronic components to allow for separately controlling power levels and timing of power delivery to each of the receptacles 102, 104, and 106. Components within controller 110 can include, for example, digital electronic components, analog-to-digital (ND) converters, digital-to-analog (D/A) converters, or analog components. Typically these components are configured as integrated circuit (IC) components or chips that can be mounted on one or more IC boards (not shown) located within the housing 111. In the embodiment shown, power connectors 112, 114, 116, and 118 pass through the housing 111 for direct connection to an IC board inside the controller 110. The controller 110 can also contain one or more transformers to convert the supply power from 120 V AC to 12 V DC to power components on the IC board. The different embodiments of the disclosed apparatus are represented by different control mechanisms, or arrangements of different electronic components within the controller 110.

Although three power receptacles are shown in FIG. 1, other embodiments may include less than three receptacles or more than three receptacles, and the receptacles 102, 104, and 106 can accommodate signals other than, or in addition to, a power signal. In such embodiments, the controller 110 can be programmed to control the receptacles in other ways in addition to providing power control. Accordingly, instructions governing the IC chip within the controller 110 can be can modified to modulate these other signals in addition to modulating the power signal. Furthermore, the instructions governing the IC chip can be provided in advance (e.g., pre-set using a timing device), or remotely through a wireless connection, giving users more flexibility in creating different effects.

Figure 2:
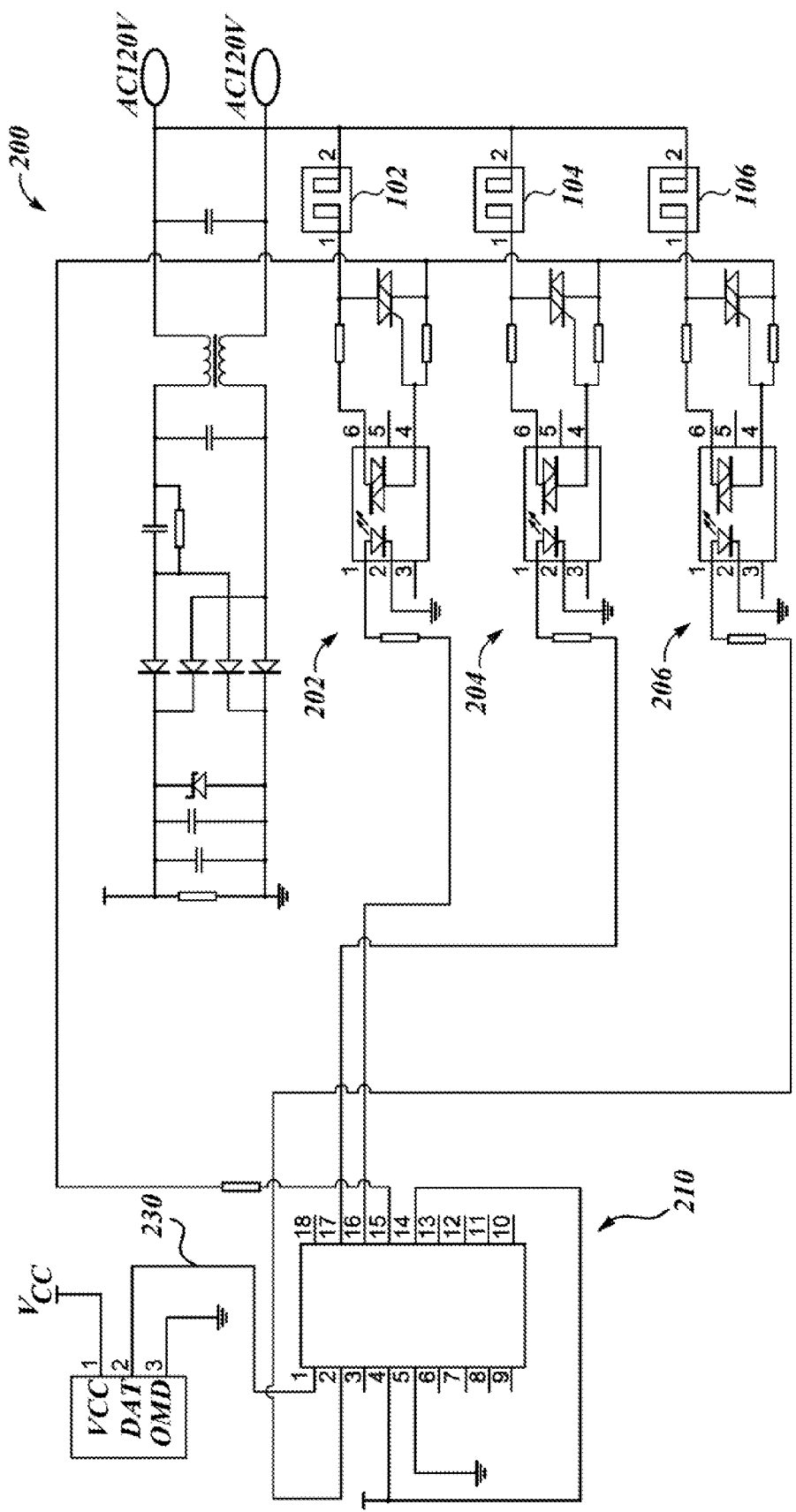
FIG. 2 is a schematic diagram of a first exemplary control circuit that can be implemented as part of the controller shown in FIG. 1.

A schematic for an exemplary control circuit 200 within the controller 110 is shown in FIG. 2. The control circuit 200 includes power distribution stages 202, 204, and 206, an IC controller chip 210, sensors (not shown), and a controller input line 230. The power distribution stages distribute power to each of the receptacles 102,104, and 106, respectively. The IC controller chip 210 can be, for example, an EEPROM (erasable, electrically programmable read-only memory) chip, or a processor chip that executes user-selectable instructions. According to one embodiment, the EEPROM controller chip 210 can be hard-coded with a set of instructions to produce desired light patterns by modulating power at each of the receptacles 102, 104, and 106. According to other embodiments, the controller chip 210 can receive hard-wired instructions via user-operated switches, or the controller chip 210 can receive user-programmed instructions communicated via a remote receptor device.

Components within the controller chip 210 can further include electronic sensors 220 that act as remote receptor devices to detect wireless communication signals such as infrared signals, radio frequency (RF) signals, microwave signals, and the like. Use of electronic sensors 220 allows for remote control of the power supplied to the receptacles 102, 104, and 106, including recognizing wireless signals, and receiving instructions provided by an end user via one or more remote control devices, as shown below in FIG. 10. Information from the sensors 220 can be input into the controller chip 210 via controller input line 230, which can be configured as a data channel. User-provided instructions can be downloaded, saved in a memory within the controller, used to burn an EEPROM, pre-set to activate at a selected time, or they can influence power control signals in real time.

Figure 3:
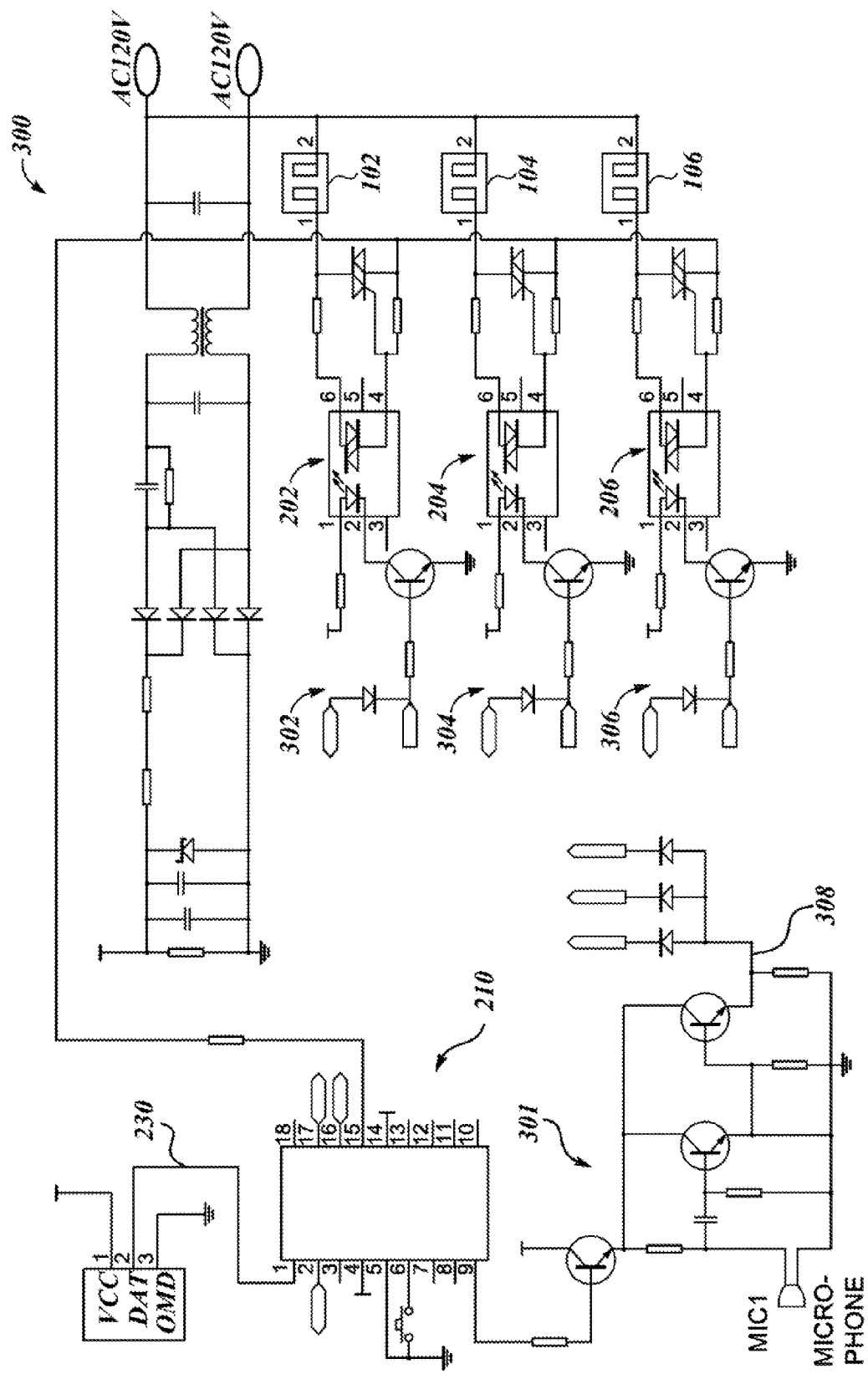
FIG. 3 is a schematic diagram of a second exemplary control circuit including a sound control stage that can be implemented as part of the controller shown in FIG. 1.

In one embodiment, additional components can be added to the control circuit 200, as shown in FIG. 3. For example, a sound-enhanced control circuit 300 can be used to control the power supplied to the receptacles 102, 104, and 106 by further including a microphone stage 301 and sound input stages 302, 304, and 306. The sound input stages 302, 304, and 306 are electrically coupled to the receptacles 102, 104, and 106, respectively. An output signal 308 from the microphone stage 301 can be electrically coupled to drive each of the sound input stages 302, 304, and 306 so that lighting effects are created in response to sound input, e.g., music.

Figure 4A:
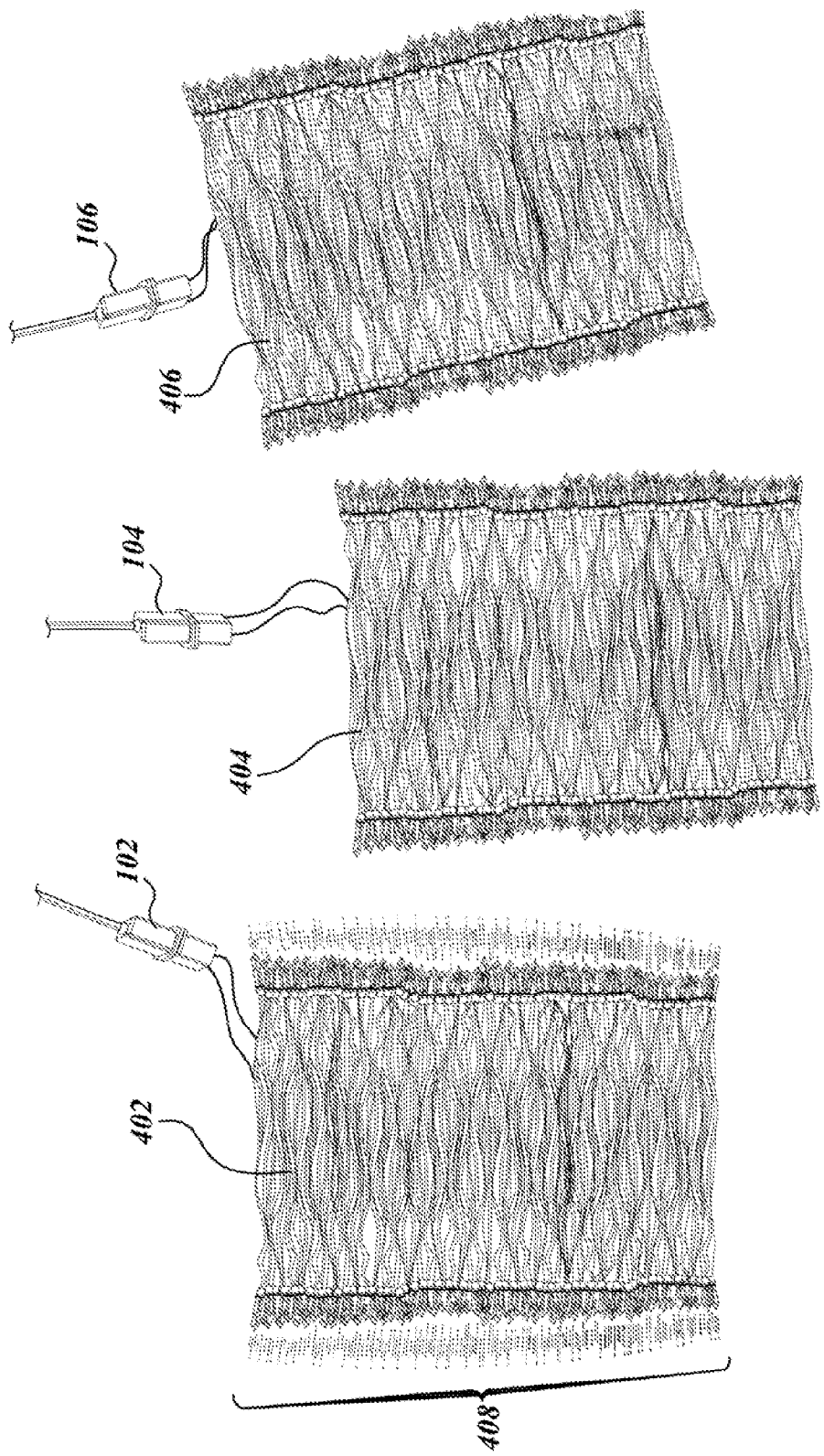
Figure 4B:
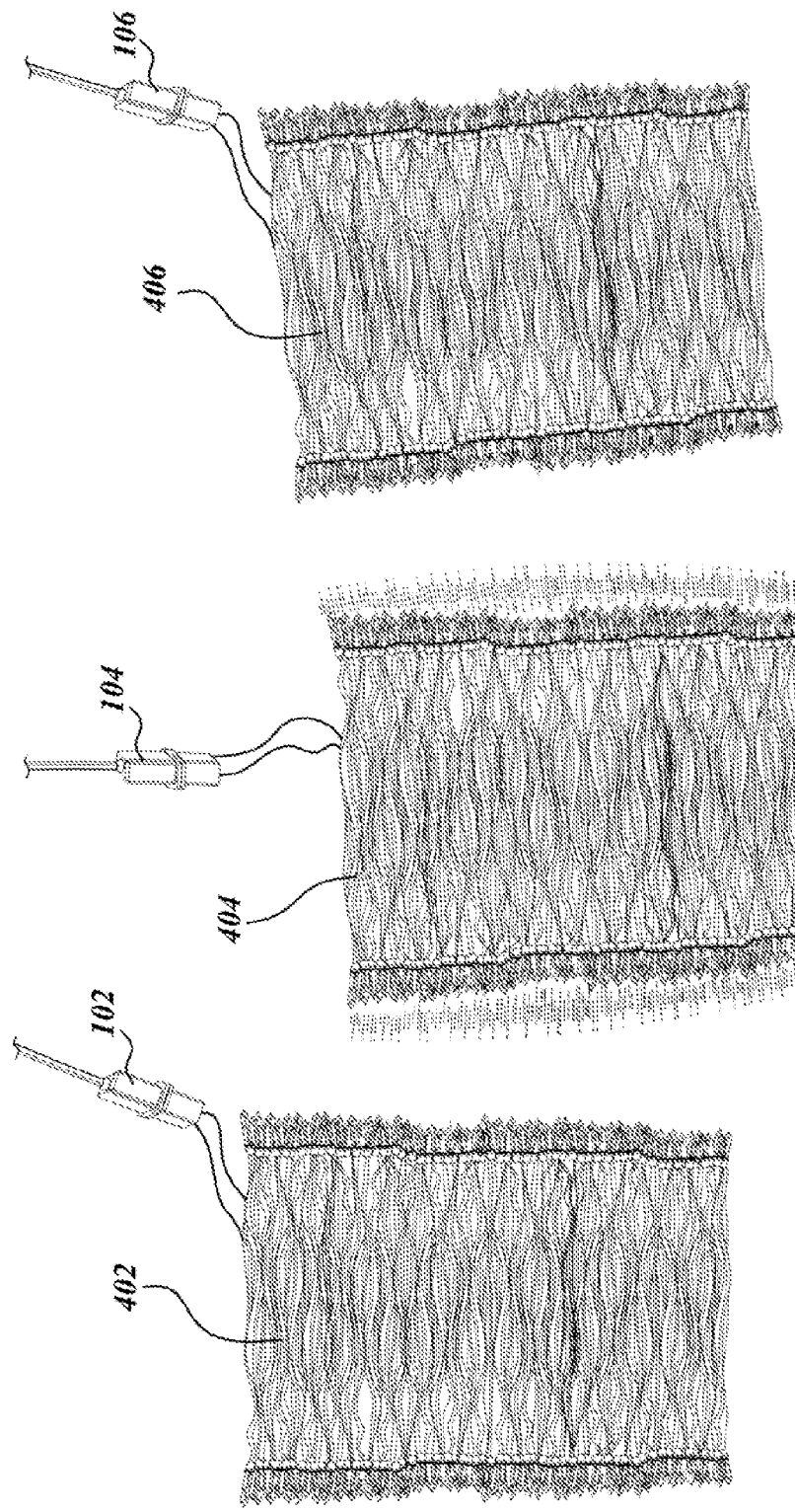

The receptacles 102, 104, and 106 can be coupled to conventional light arrays 402, 404, and 406, respectively, as shown in FIGS. 4A-4C, such that the controller 110 can make an ordinary light set capable of achieving different creative lighting effects such as special "chasing effects." The coupling can be a wired connection in which each receptacle receives a male power connector attached to the light array. Typically each receptacle 102, 104, and 106 is an AC (alternating current) power receptacle, but embodiments are not so limited. Alternatively, the receptacles can be DC (direct current) receptacles. The receptacles 102, 104, and 106 can be in the form of conventional two-prong plug receptacles, optionally accepting a third GFI (ground-fault interrupt) prong, which is commonly required to meet safety guidelines for use in kitchens, bathrooms, outdoors or in other wet environments. The receptacles 102, 104, and 106 can be adapted to receive other types of connectors capable of transmitting electric power and/or other controllable electrical signals to a load (e.g., a 12 V computer power plug, a USB connector, or any one of the many available power re-charging connectors used for electronic communications devices such as cell phones.)

FIGS. 4A-4C each show light arrays 402, 404, and 406 that can be plugged into receptacles 102, 104, and 106, respectively. In the top frame, FIG. 4A, the light array 402 is activated while the light arrays 404 and 406 remain off; in the middle frame, FIG. 4B, the light array 404 is activated while the light arrays 402 and 406 remain off; in the bottom frame, FIG. 4C, the light array 406 is activated while the light arrays 402 and 404 remain off. Thus, it is explicitly shown that power supplied to each one of the light arrays 402, 404, and 406 can be controlled independently of the other light arrays. As a result, each light array can be activated individually or in coordination with the other light arrays.

Each light array 402, 404, 406 in turn comprises a set of lamps 408 that can be low-power LED (light-emitting diode) lamps, but embodiments are not so limited. The lamps 408 can contain fluorescent elements, incandescent bulbs, phosphorescent light sources, fiber-optic elements, LCDs, or similar lighting elements. The lamps 408 can also have fixed or variable color and brightness characteristics. Furthermore, lamps can be housed in a wide variety of decorative light fixtures and lawn ornaments, placed indoors or outdoors, incorporated into architectural features, used in homes, offices, commercial establishments, landscapes, gardens, furnishings, signs, billboards or other advertising platforms, and the like, for creative effect.

Figure 5:
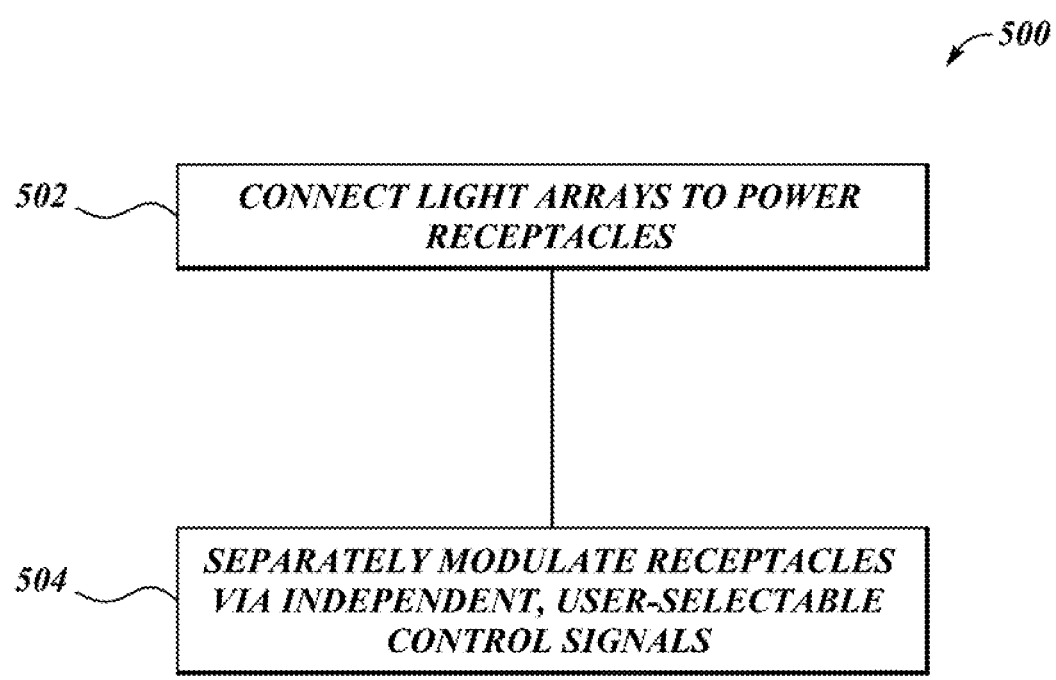
FIG. 5 is a flow diagram showing generalized steps of a high-level method disclosed.

FIG. 5 illustrates a high level method 500 of operating the multi-function lighting display apparatus, with emphasis on its advantageous features. In step 502, light arrays 402, 404, and 406 are connected to the receptacles 102, 104, 106. Then, in step 504, electric power at each of the receptacles 102, 104, and 106 is independently modulated by control signals that are user-selectable.

Figure 6:
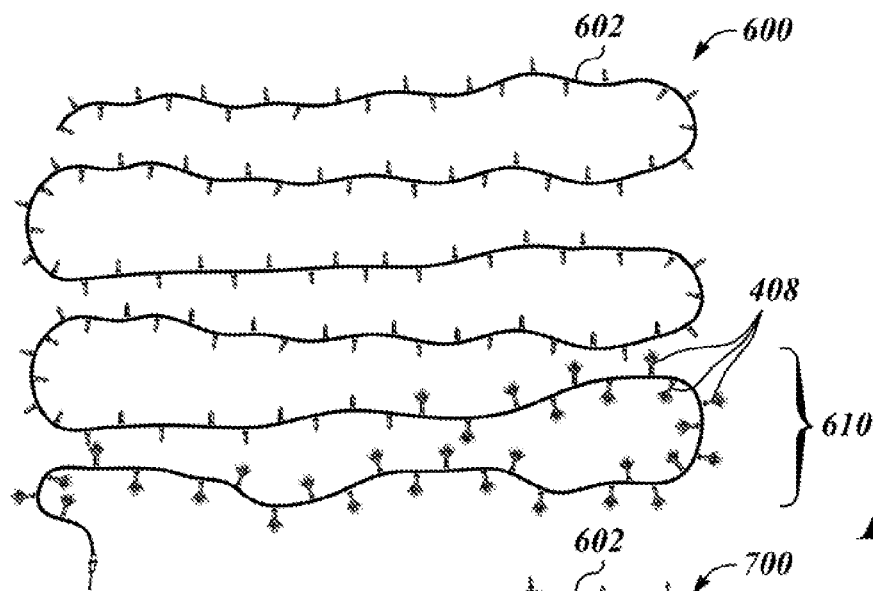
FIGS. 6-8 show a series of pictorial views of an exemplary light array, in which different subsets of lights are activated by the controller shown in FIG. 1.
Figure 7:
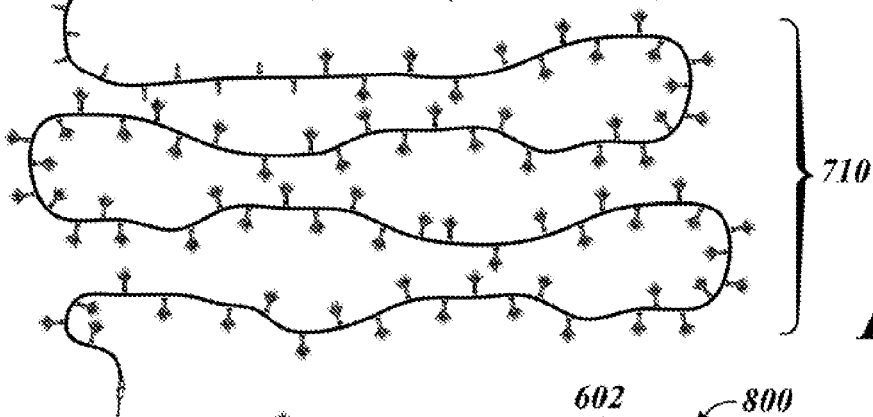
Figure 8:
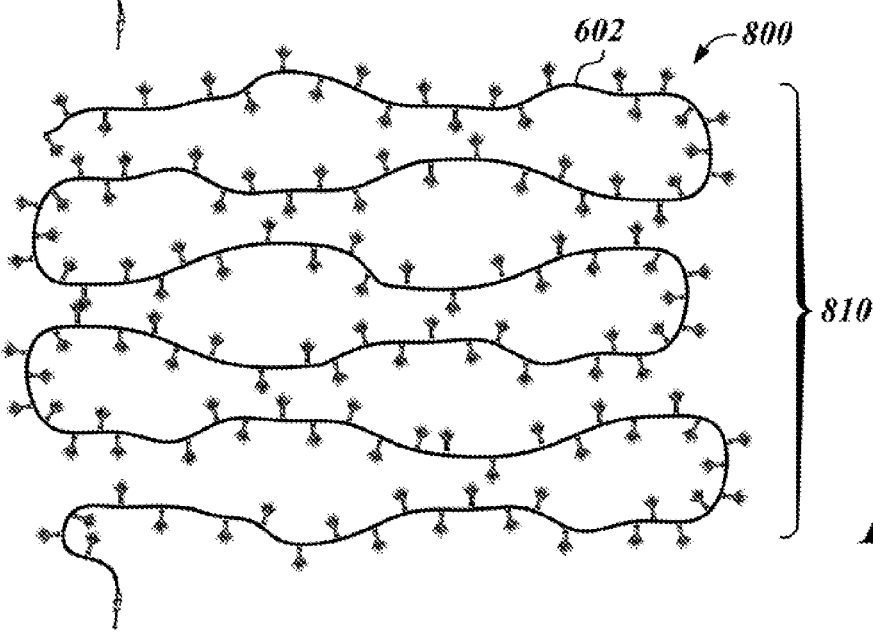

FIGS. 6-8 show a series of snapshots of an exemplary multi-circuit decorative light array 602 in which subsets of the individual lamps 408 can be illuminated in different patterns according to user-selectable instructions from the controller 110. For example, the series in accordance with user-selectable instructions from the controller 110 as shown illuminates the array 602 of lamps 408 in succession, each of the individual lamps 408 remaining on until the entire array is illuminated, thus creating a "filling" pattern. FIG. 6 shows a first snapshot 600 at a first time $t_1$, in which a first subset of lamps 610 is illuminated; FIG. 7 shows a second snapshot 700 at a second time $t_2$, in which a second, larger, subset of lamps 710, which includes the first subset of lamps 610, is illuminated; and FIG. 8 shows a snapshot 800 at a third time $t_3$, in which a complete set of lamps 810 is illuminated. If each successive individual lamp 408 or subset of lamps 610, 710, 810 were to flash for a short time instead of remaining illuminated, a "chasing" pattern would be produced. Likewise, if three or more different light arrays, such as those shown in FIGS. 4A-4C, are energized in succession, a chasing effect can also be produced.

FIGS. 9A and 9B show how construction of the multi-circuit decorative light array 602 differs from that of existing (prior art) light arrays to produce special lighting patterns such as the one shown in FIGS. 6-8. With reference to FIG. 9A, a schematic of an existing light array 900 is shown, the array being arranged as a current divider circuit in which each of four strands 901, 902, 903, and 904, of individual lamps, 911, 912, 913, and 914, respectively, is accessible by an electrical coupling device (e.g., wire segment) 916, 918, 920, and 922, respectively. Lamps 911, 912, 913, and 914 are spaced apart along each of the wire segments 916, 918, 920, and 922. The overall light array 900 is electrically coupled by a current supply wire 924 electrically connected in parallel to each of the strands 901, 902, 903, and 904. When the strands 901, 902, 903, and 904 are aligned and twisted into one elongated strand, the spaced-apart lamp arrangement shown in FIG. 9A is thus capable of causing alternate flashing along the light strands, but not localized flashing of neighboring groups of lamps.

With reference to FIG. 9B, a schematic of a multi-circuit decorative light array 950 according to the present disclosure shows a current divider circuit having four spatially localized groups 951, 952, 953, and 954, of individual lamps, 961, 962, 963, and 964, respectively, wherein each spatially localized group is accessible by a separate electrically parallel wire segment 966, 968, 970, and 972, respectively. The overall light array 950 is electrically coupled by a current supply wire 974 connected in parallel to each of the spatially localized groups 951, 952, 953, and 954.

Unlike lamps 911, 912, 913, and 914 shown in FIG. 9A, lamps 961, 962, 963, and 964 in the light array 950 are not spaced apart along each of the wires 966, 968, 970, and 972. Instead, they are adjacent to one another (localized) such that when the wire segments 966, 968, 970, and 972 are aligned, and independently energized, the arrangement shown in FIG. 9B permits each group of localized lamps to flash together, causing each group to appear as a much more prominent light source. Therefore, when effects such as "chasing" are programmed via controller 110, the chasing effect is perceived to be more spectacular than what is achievable with the conventional arrangement shown in FIG. 9A.

Another advantage of the light array 950 is that such a localized spatial arrangement of lamps uses about 30% less wire material than the conventional light array 900. The light array 950 can be used in various array configurations, not limited to the linear (one-dimensional) light array shown. These alternative configurations include, for example, two-dimensional light arrays such as net lights and icicle lights, as well as garland lights.

In conjunction with the sensors 220 deployed within, or connected to, the controller 110, the "filling" or "chasing" patterns described above can, for example, illuminate a walkway or a garden path to a residence as a pedestrian progresses toward a building entrance. In response to signals from the sensors 220, light array patterns such as filling and chasing patterns, for example, can be used generally to trace the progress of a moving object, or to provide a luminous representation of an object or a process, toward a destination.

According to certain embodiments, a specific light pattern for each light array can be either hard-wired, pre-programmed, or selected and communicated in real time to the controller 110. For example, different light patterns can be user-selected using a mechanical switch (e.g., a push button switch, a toggle switch, a rotary switch, a dial, or the like) attached to the controller 110 or directly connected to the controller 110. In accordance with more complex embodiments described herein, the array 602 can be user-programmed to create and modify many different lighting effects by activating different lamps at different times, speeds, intensities, and so forth to produce many different light patterns. Some common patterns include, in addition to filling and chasing, twinkling, blinking, flashing, color fading, color changing, dimming, and the like, as well as combinations of different types of effects. Complex light displays (e.g., seven different levels of fading) are thus facilitated by the features that provide for independent control of the different light arrays 402, 404, and 406 via the different receptacles 102, 104, and 106, and for user-programmable control.

Figure 10A:
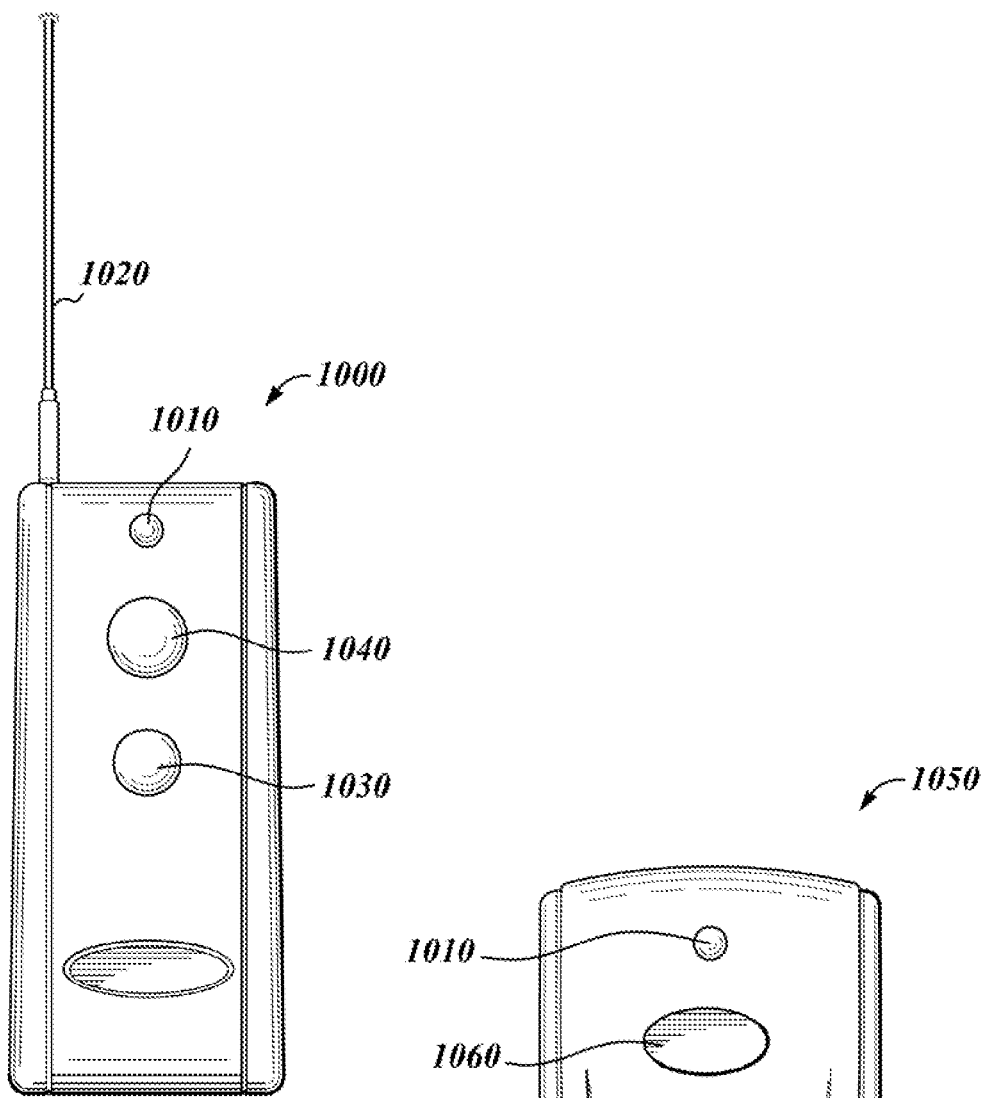
FIGS. 10A and 10B are a pictorial plan views of two exemplary remote control devices that an end user could employ to communicate control information to the lighting display apparatus shown in FIG. 1.
Figure 10B:
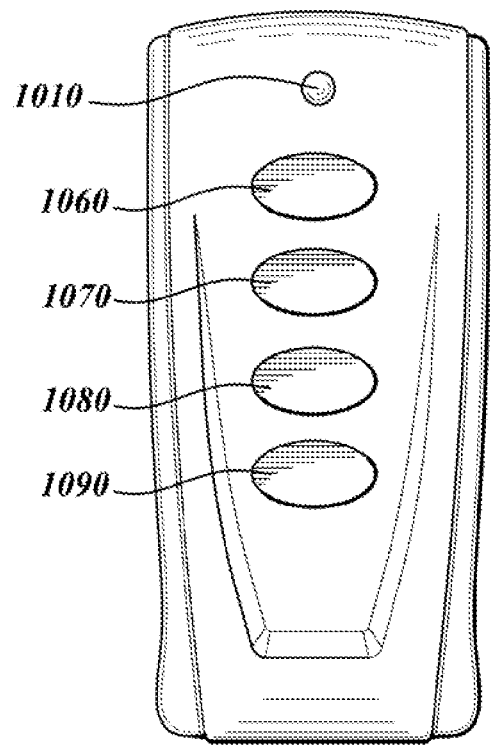
Figure 11:
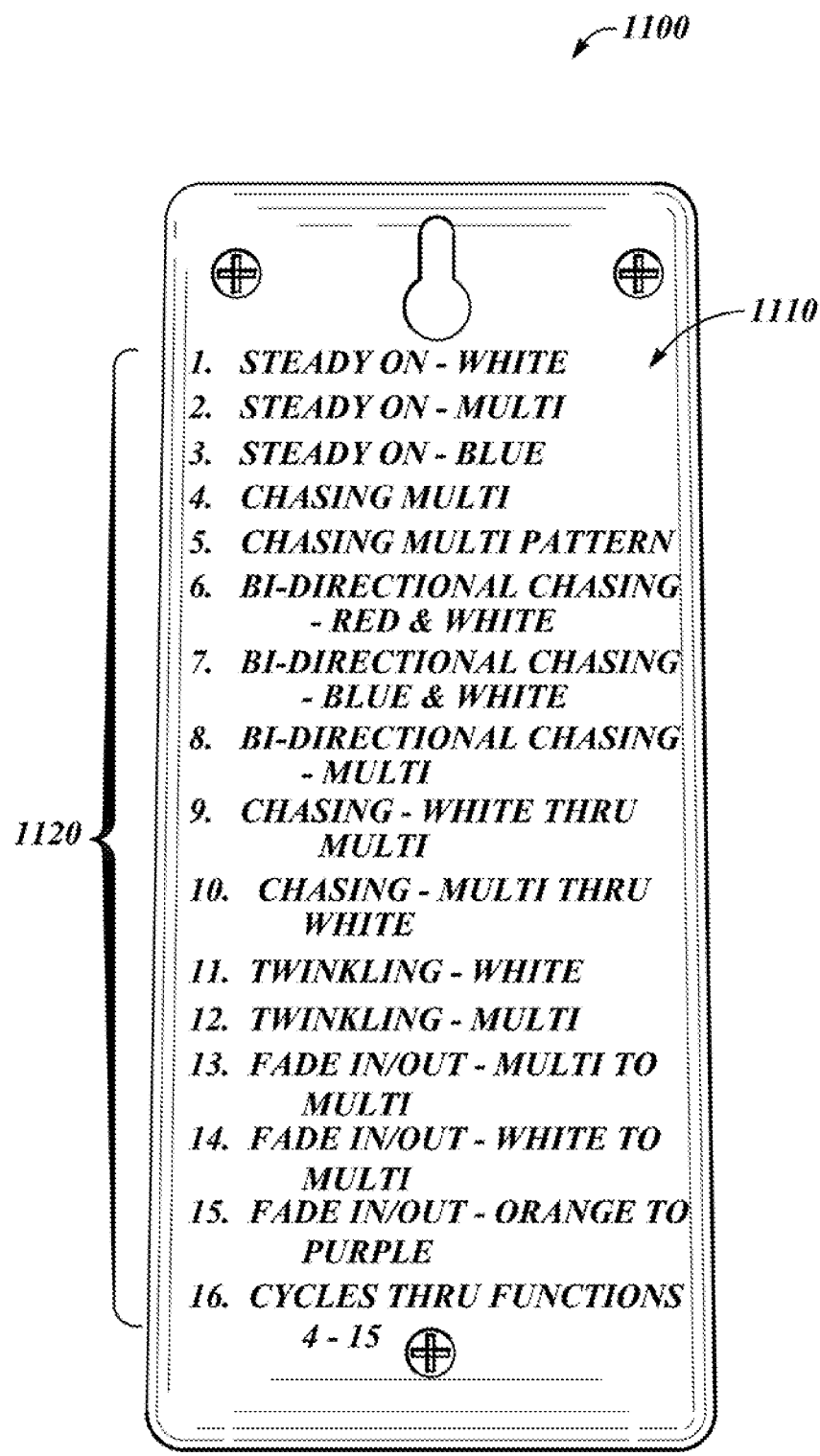
FIG. 11 is a pictorial plan view of the back of the remote control device shown in FIG. 10.

With reference to FIG. 10A, 10B, and FIG. 11, according to one embodiment, a remote control device 1000 can be equipped with an indicator light 1010, an antenna 1020, and one or more control buttons 1030 and 1040 to facilitate directing the controller 110. The remote control device 1000 can further be equipped with an infrared transmitter (not shown). The remote control device 1000 generally allows an end user to submit instructions to the controller 110 from a remote location, when the controller 110 is equipped with a sensors that are capable of detecting signals from the remote control device 1000. The remote controller range is typically up to about 50 m. The antenna 1020 can be used to send relatively low-power signals at short range (similar to a television remote control device). Or, the antenna 1020 can be used to send higher power RF or microwave signals at a longer range. Alternatively, the antenna 1020 can operate at other electromagnetic wavelengths. Control buttons 1030 and 1040 can be programmed, for example, to download instruction sets to the controller 110 to create complex lighting display patterns by activating the different light arrays according to the user's creative inspiration. More specifically, the remote control device 1000 can be implemented as, for example, a networked computing device e.g., a laptop computer, a tablet computer, a smart phone, or a cell phone, optionally equipped with a WiFi® or a Bluetooth® communication device for high-speed short-range transmission.

In another embodiment shown in FIG. 10B, an exemplary remote control device 1050 can have a set of control buttons including, for example, a power button 1060, a function button 1070, a dimmer button 1080, and a sensor button 1090. The power button 1060 can be used to toggle the remote control on and off. The function button 1070 can be used to select a lighting display pattern from a set of pre-programmed lighting display patterns (e.g., the display patterns 1120 as described below). The dimmer button 1080 can be used to select (e.g., reduce) a fading rate for the light intensity by repeatedly activating the dimmer button 1080, or by holding down the dimmer button 1080. The sensor button 1090 can be used to toggle the electronic sensor(s) 220 on and off. Alternatively, the control buttons 1060, 1070, 1080, and 1090 can be hard-wired or programmed to control other aspects of the lighting display apparatus 100.

FIG. 11 shows the back 1100 of the exemplary remote control device 1000, programmed to provide a menu 1110 of sixteen different lighting display patterns 1120 for arrays each configured with light bulbs of a different color; for example, three arrays 402, 404, and 406 that have red, white, and blue bulbs, respectively. Each of the sixteen patterns can be selected using control buttons 1030 and 1040 shown in FIG. 10. For example, lighting pattern choices 1, 2, and 3 can cause each array to be on continuously. Lighting pattern choices 4-14 can provide different chasing, twinkling, and fading patterns by independently modulating the three receptacles 102, 104, and 106 to which the red, white, and blue arrays are electrically coupled. If the lighting display apparatus 100 is configured according to FIG. 9B, in which multi-circuit decorative light arrays 950 allow more localized control, different colors can be accessed and controlled within the same array. For example, individual lamps 961 could be all red, individual lamps 962 could all be blue, and so on. In a system that has additional receptacles to accommodate additional colored arrays (e.g., 901-904), or additional localized groups of lamps (e.g., 951-954), for example, an array or group of orange lamps and an array or group of purple lamps, lighting pattern 15 is set up to control these additional colored lamps. Lighting pattern 16 can be programmed, for example, to cycle sequentially through the other lighting pattern choices 1-15, or, alternatively, to activate the other patterns according to another programmed sequence, or to activate the other patterns in a random order.

Figure 12A:
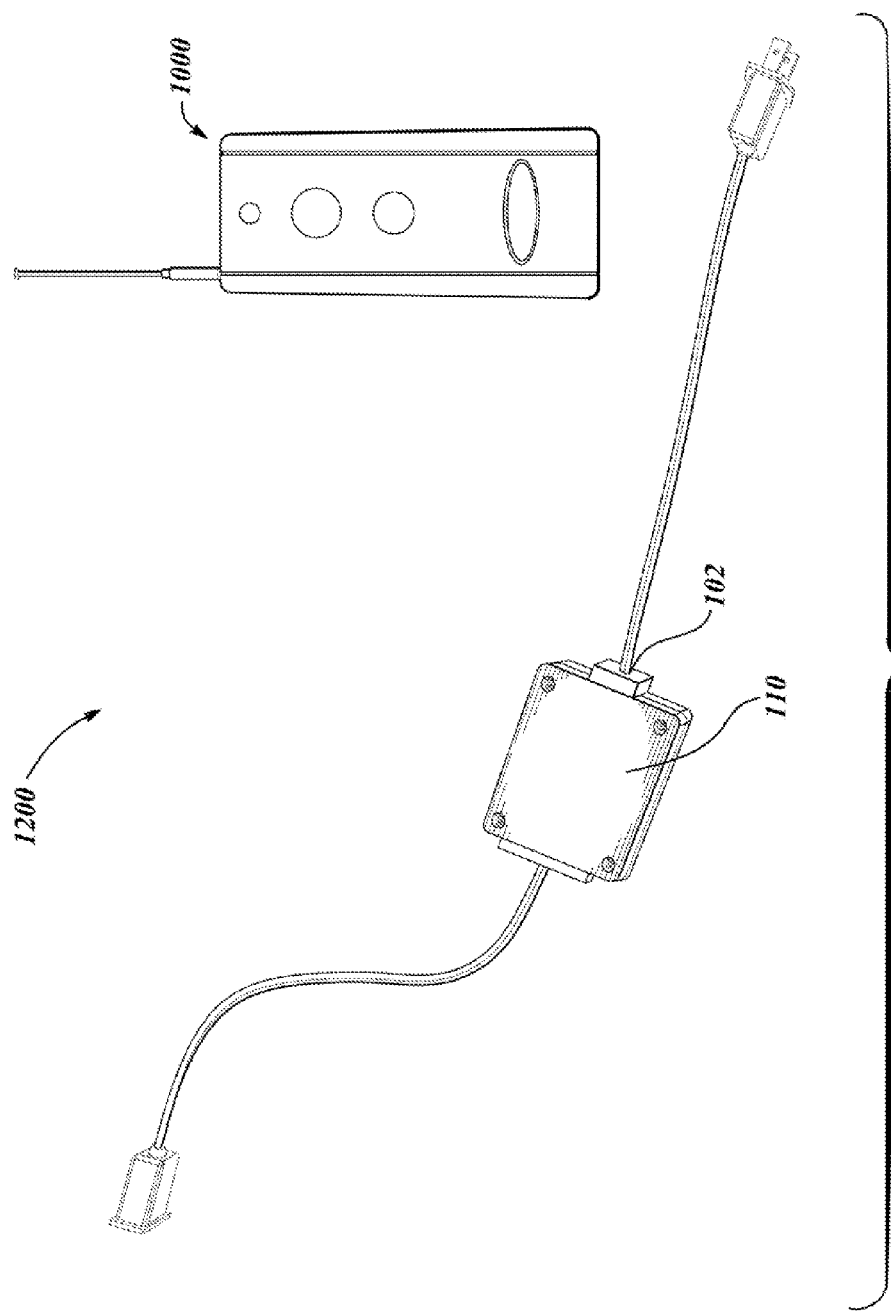
FIG. 12A is a pictorial view of a multi-function lighting display apparatus having a single receptacle, wherein the apparatus includes the remote control device shown in FIGS. 10 and 11.
Figure 12B:
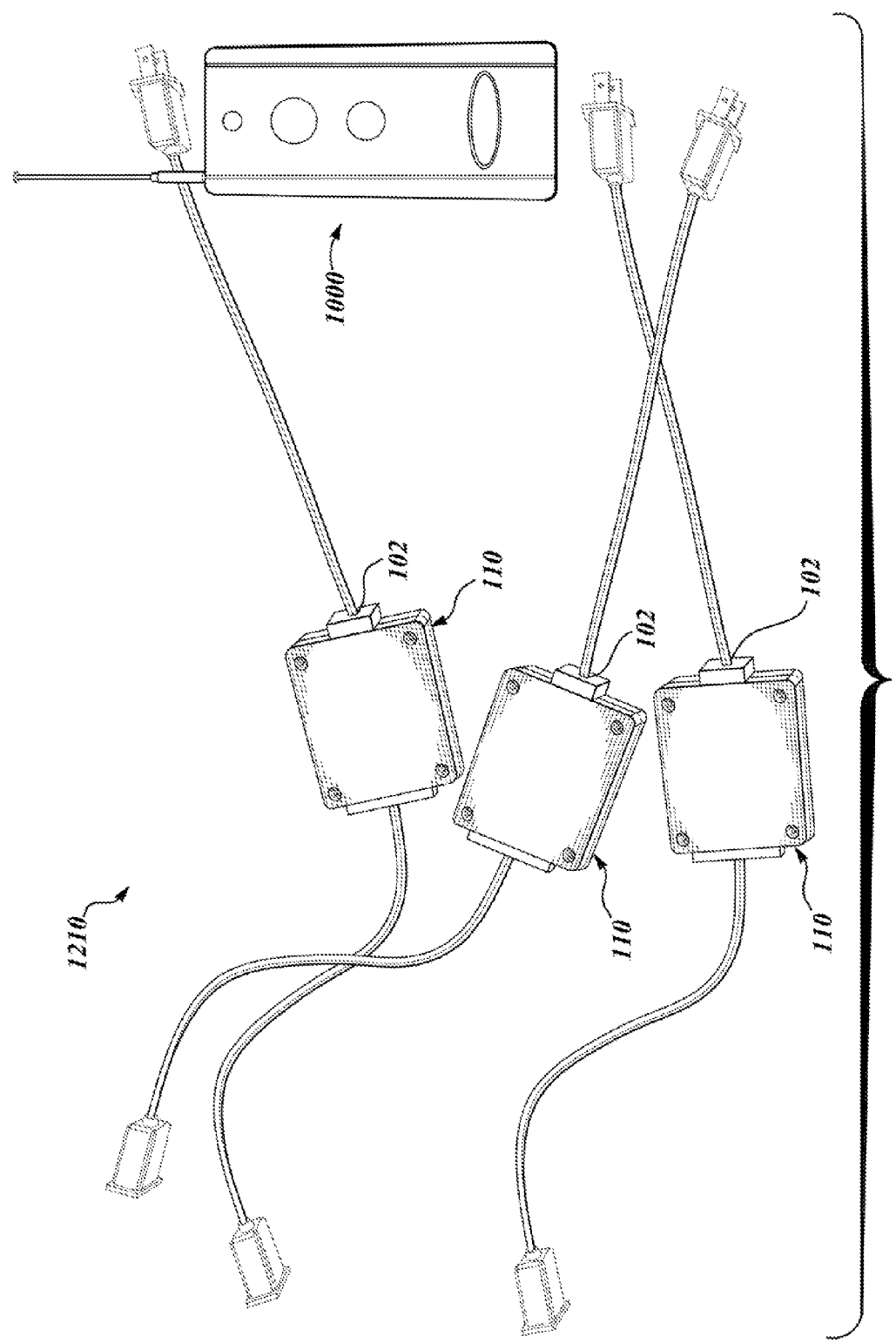
FIG. 12B is a pictorial view of one embodiment of a multi-function lighting display apparatus having three secondary controllers, wherein the apparatus includes the remote control device shown in FIGS. 10 and 11.
Figure 13:
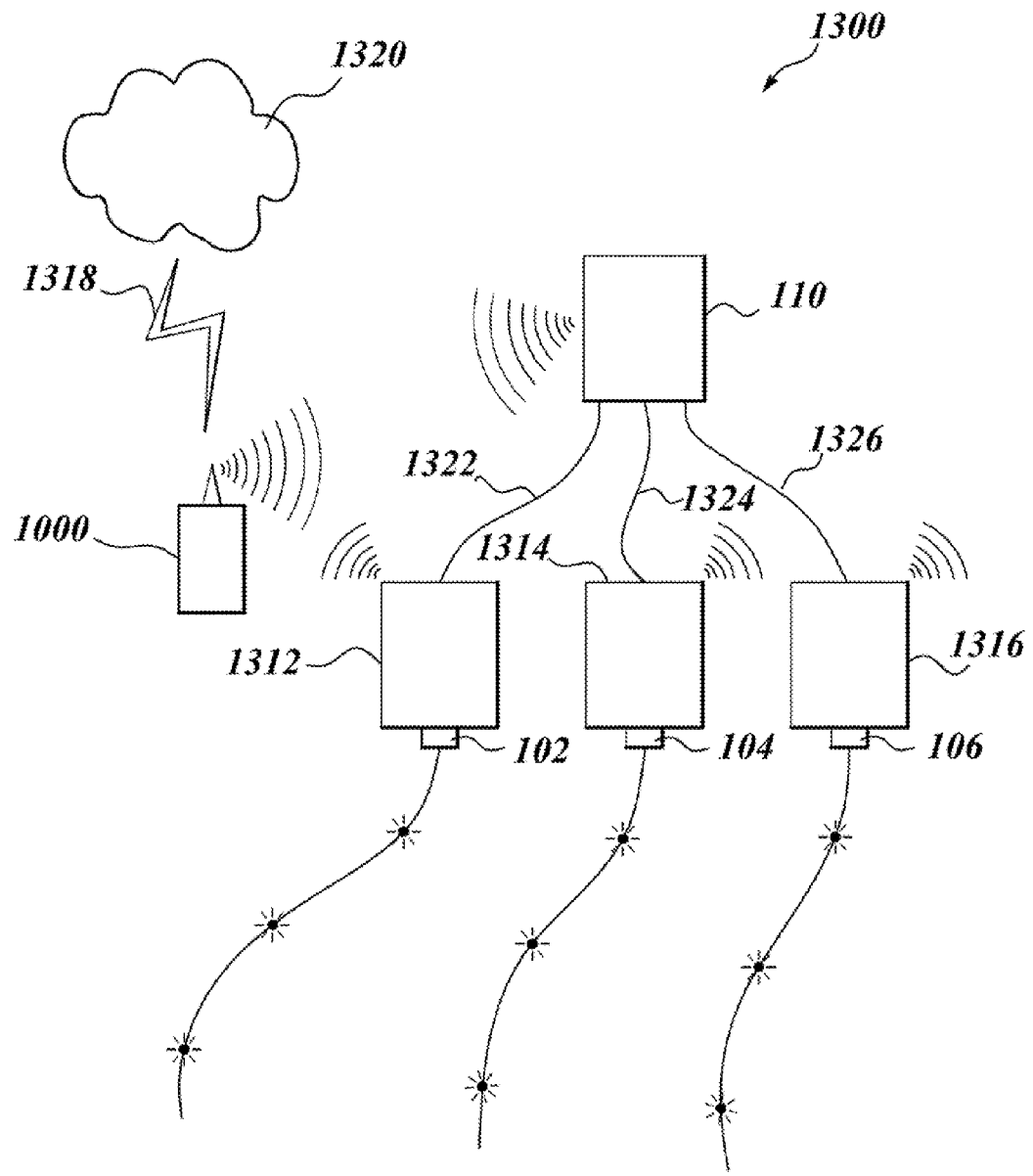
FIG. 13 is a block diagram of a decorative light array system, according to one embodiment, in which each light array is connected to the main controller via a secondary controller, and the controllers are equipped with wireless communication devices.

FIGS. 12A, 12B, and 13 illustrate various multi-controller embodiments that employ the remote control device 1000 and can be offered as different commercial packages. For example, a single light array package 1200, as shown in FIG. 12A, can include a single main controller 110 having a single receptacle (e.g., 102), or multiple receptacles (e.g., 102, 104, and 106, not shown). Alternatively, a first multi-controller package 1210, as shown in FIG. 12B, can come equipped with a plurality of main controllers 110 (three shown), each main controller 110 having a single receptacle 102, and each main controller 110 being activated by signals from a common remote control device 1000.

FIG. 13 illustrates another alternative embodiment, a second multi-controller package 1300, that introduces a plurality of secondary controllers 1312, 1314, and 1316 that can be connected between the receptacles 102, 104, and 106, respectively, and the main controller 110. The secondary controllers 1312, 1314, and 1316 can communicate with the main controller 110 via wired communication paths 1322, 1324, and 1326, respectively, or via wireless communication paths. The secondary controllers 1312, 1314, and 1316 are each subject to user control via the remote control device 1000. The remote control device 1000 may, in turn, be able to communicate via a wireless path 1318 with a network such as the Internet or a cloud-based system 1320, to exchange information with a Web site associated with the manufacturer of the second multi-controller package 1300.

The embodiments shown in FIGS. 12A, 12B, and 13 can generally include any or all of the features described herein in the context of a single controller system. These features include, but are not limited to, the use of sensors, pre-programmed lighting patterns, user-configurable programs, localized control, and the like.

Figure 14:
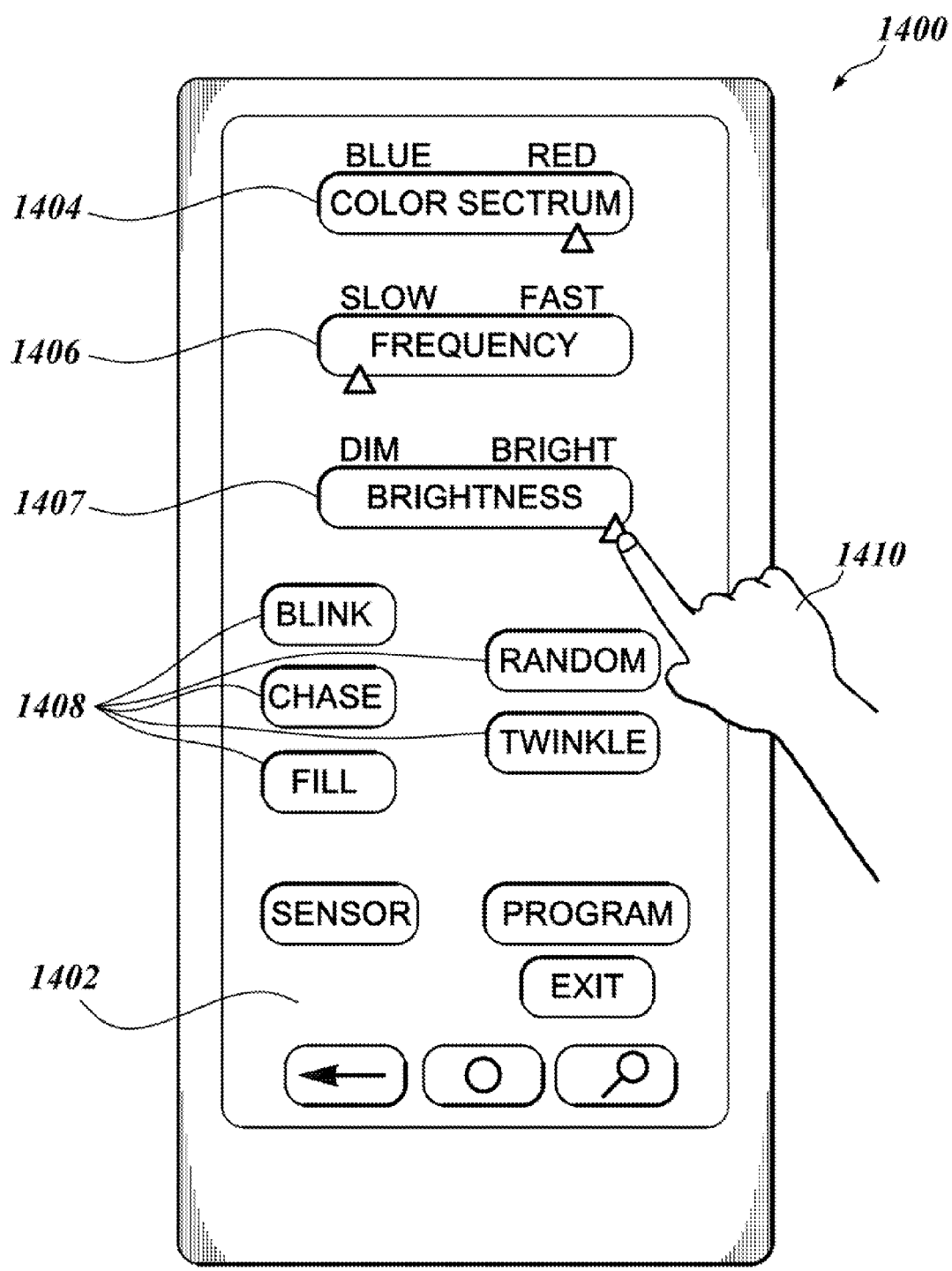
FIG. 14 is an exemplary screen shot of an interactive smart phone application used as a remote controller for creating complex lighting effects, according to an exemplary embodiment.

Interactive user control of a multi-function lighting display using a mobile device can be facilitated by a mobile application, shown by example in FIG. 14, as being implemented on a smart phone 1400. The smart phone implementation can be used as an alternative to the remote control device 1000. A smart phone screen shot 1402 can include settings such as, for example, a color slide bar 1404, a frequency slide bar 1406, a brightness slide bar 1407, and a menu of light pattern choices 1408, which provide a convenient user interface for selecting desired light patterns. User selections thus entered into the mobile device can be interpreted and transmitted to the controller 110. For example, a user 1410 can select from a continuum of light colors using the color slide bar 1404, and likewise, from a continuum of illumination timing frequencies (e.g., flash times) using the frequency slide bar 1406, and from a continuum of illumination intensities using the brightness slide bar 1407. The menu of light pattern choices 1308 can include, for example, lighting effects such as "blink", "chase", "fill", and "twinkle." Another choice can include a "random" illumination pattern. The menu 1408 itself can be user-selectable from among a larger set of choices offered on a different screen, as part of the mobile application program.

The smart phone screen shot 1402 can also include mode setting options such as, for example, a "sensor" mode and a "program" mode. The sensor mode can be programmed, for example, to allow the smart phone 1400 to control the light patterns via a remote sensor (e.g., a wirelessly-coupled loudspeaker). The program mode can provide an opportunity for a user to design additional customized illumination patterns as alternatives to the sixteen pre-programmed choices shown in FIG. 11. According to an exemplary embodiment, the program mode allows creation of nine additional user-defined programs. These user-defined programs can be set up through a designated Web site. For each user-defined program, the user can select from among the sixteen different built-in light pattern functions described above for the remote control device 1000, which can also be made accessible on the Web site. Alternatively, the sixteen built-in functions can be set up as indicated in Table 1. The user can construct a program by specifying a sequence and duration for each desired function using control bars displayed on a programming Web page. The duration of each selected function can be specified, for example, within the range of 0-60 seconds, by adjusting a duration control bar.

TABLE 1

| ID | Function |
|---|---|
| (a) | flashing from right to left |
| (b) | flashing from left to right |
| (c) | filling & flashing from right to left and unlit from left to right |
| (d) | filling & flashing from left to right and unlit from right to left |
| (e) | 2 times flashing from right to left and then filling |
| (f) | left 2 sets & right 1 set alternate twinkling |
| (g) | filling & fading from left to right and unlit from right to left |
| (h) | filling from left to right and then filling from right to left |
| (i) | steady burning |
| (j) | twinkling (50% out only) |
| (k) | random twinkling |
| (l) | two direction flashing |
| (m) | progressively faster twinkling until steady burning |
| (n) | filling & twinkling from right to left and unlit from left to right |
| (o) | fading in & out |
| (p) | combination |

Figure 15:
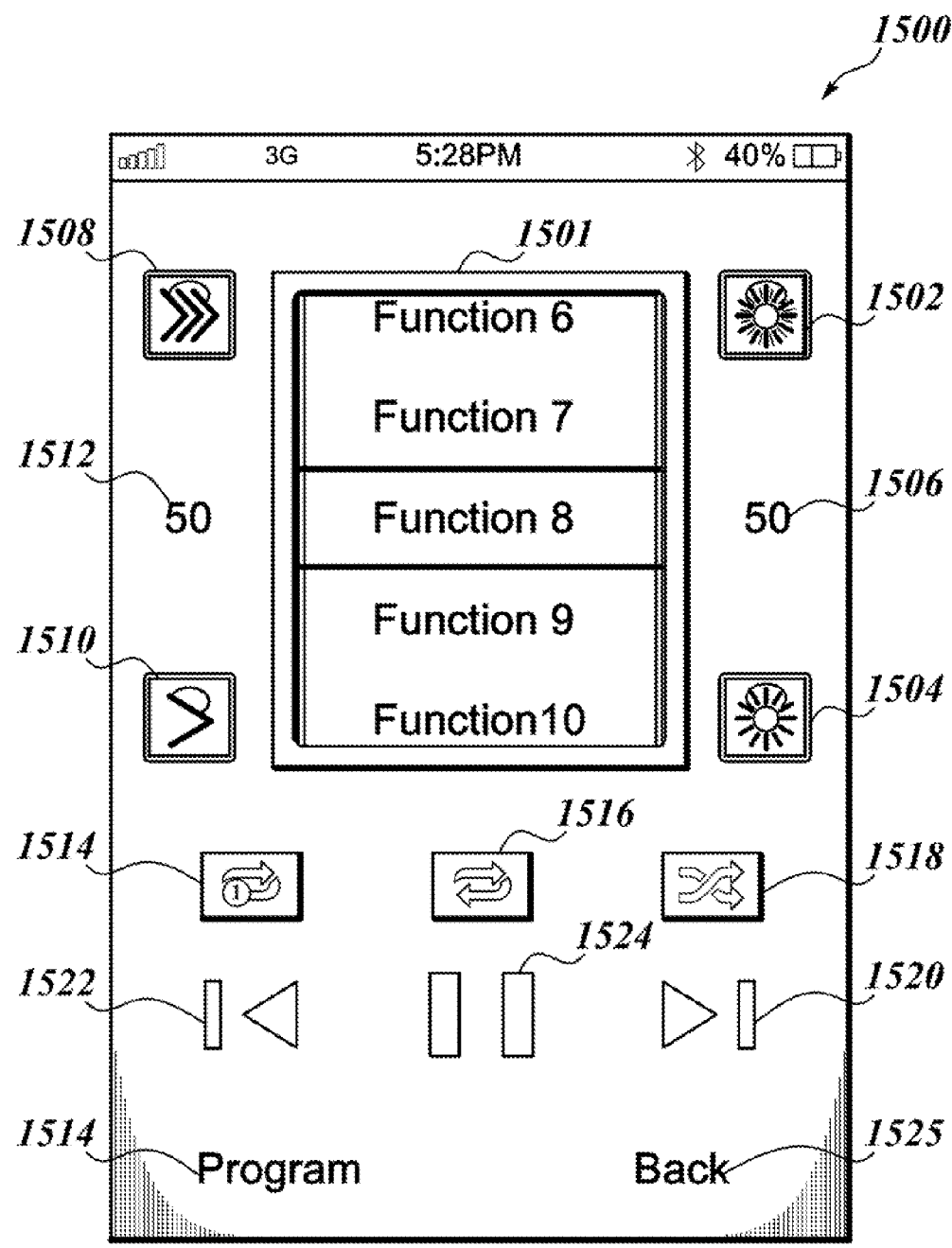
FIG. 15 is an alternative exemplary screen shot of an interactive smart phone application used as a remote controller for selecting different combinations of lighting effects, pre-programmed as built-in functions.

FIG. 15 shows a screen shot of an exemplary function screen 1500 of an interactive smart phone application used as a remote control device for selecting different combinations of lighting effects, pre-programmed as built-in functions. For example, a user can select a function from a function menu 1501, displayed in FIG. 15 as a simulated rotating wheel of functions 1-16 (e.g., "Function 8" as indicated in the center of the screen shot 1500). The selected function generally determines a light pattern, however additional functions selectable form the function menu 1501 can include a sensor mode and one or more custom programs input by a user that may define a sequence of multiple multiple associated light patterns. Once a function is selected, the user can then modify one or more associated light patterns by selecting a light intensity and a light flashing frequency. For example, the light intensity can be selected by repeatedly touching a brightness increaser 1502 or a brightness decreaser 1504. A selected brightness 1506 can be indicated, for example, by a number between 1 and 100. Similarly, the user can select a light flashing frequency by repeatedly touching a frequency increaser 1508 or a frequency decreaser 1510. A selected frequency 1512 can be indicated, for example, by a number between 1 and 100. Repeat option buttons 1514, 1516, and 1518 can be selected to repeat a single pattern, repeat a sequence of patterns, or to shuffle different patterns, respectively. Playback controls can be used to navigate a sequence of patterns by advancing to a next pattern (1520), returning to a previous pattern (1522), playing back the sequence, or stopping playback of the sequence (1524). A back button 1525 returns to a previous screen. A program button 1526 selects a program mode and advances to a programming screen described below.

Figure 16:
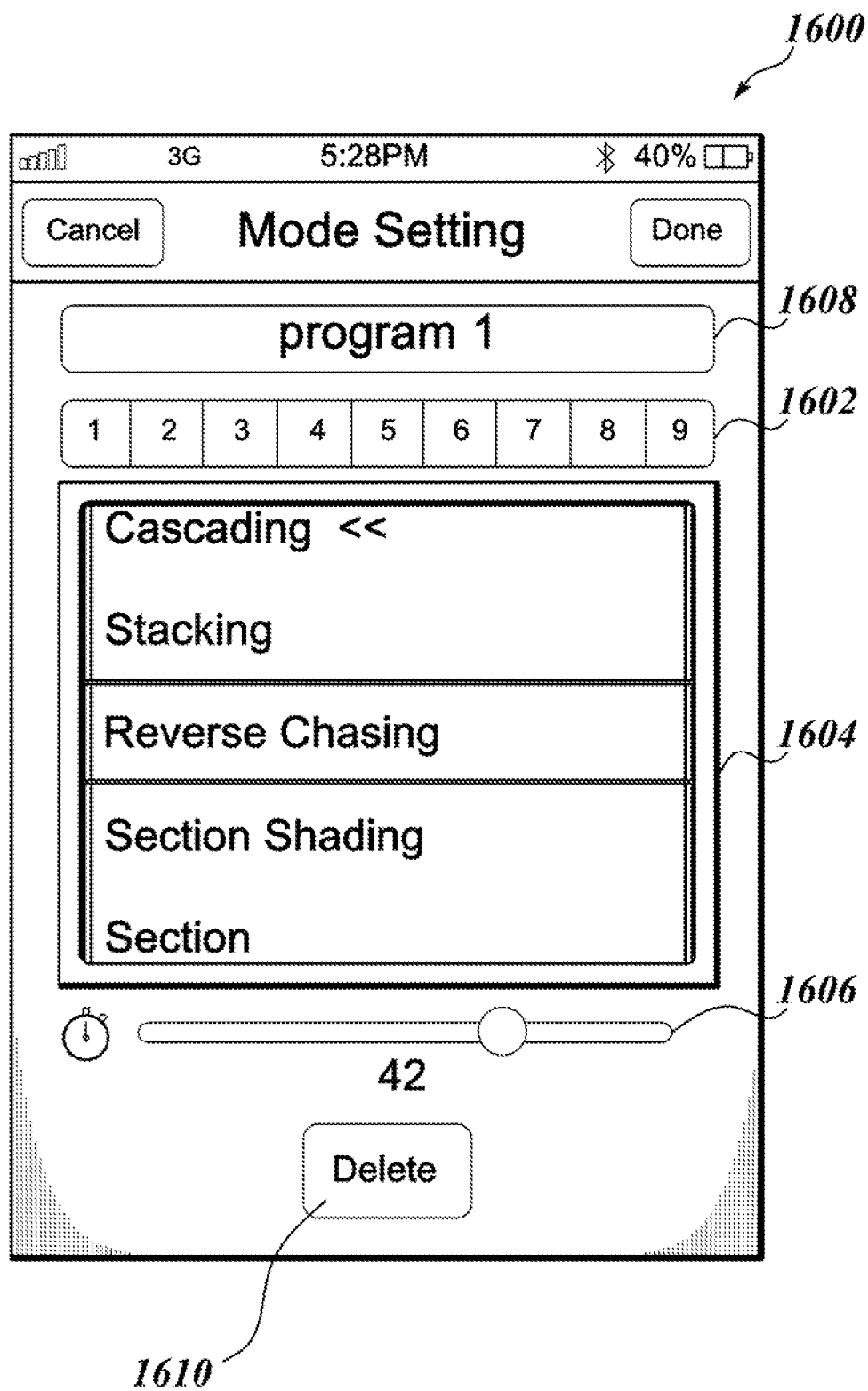
FIG. 16 is an exemplary screen shot of an interactive smart phone application that allows a user to create a programmed sequence of lighting effects.

FIG. 16 shows a screen shot of an exemplary program mode screen 1600 in an interactive smart phone application that allows a user to program different combinations of lighting effects. A program can be defined by a sequence of up to nine program segments 1602 chosen from a lighting pattern menu 1604 displayed as a rotating wheel of lighting patterns such as, but not limited to, those listed in Table 1. Additional lighting patterns can include chasing right, chasing left, cascading right, cascading left, stacking, reverse chasing, section shading, steady on, flashing, rhythmic stacking, rhythmic flashing, section flashing, fade in, fade out, and a multi-light show. A duration for each program segment 1602 can be selected using a time interval scroll bar 1606, indicated by a number between 1 and 60, which can have units of seconds or minutes, for example. A program title 1608 can be entered by the user, and the program can be saved in memory. Once the program is saved in memory, it can be automatically added to the function menu 1501 selectable from the rotating wheel on the function screen 1500. A delete button 1610 can be used to eraser the displayed program 1608 from memory.

Figure 17:
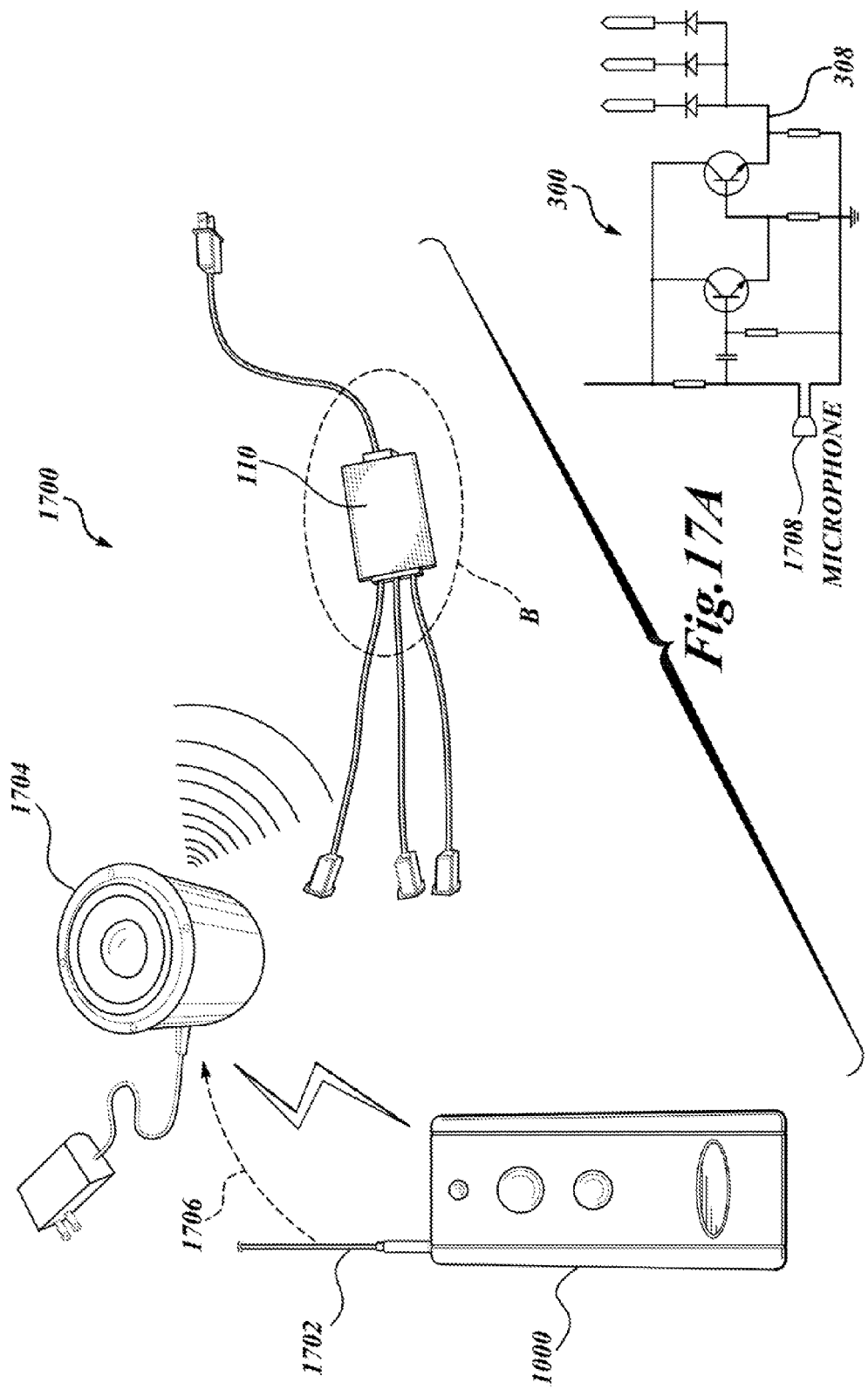
FIG. 17A is a system diagram of a sound-controllable multi-function lighting system, according to one embodiment.
FIG. 17B shows additional circuitry contained in the controller of the sound-controllable multi-function lighting system shown in FIG. 17A.

In another embodiment (see FIGS. 17A and 17B) that uses the remote control device 1000, or the smart phone 1400 in sensor mode, a user can be provided with the capability to remotely influence the controller 110 using a sensor, for example, a sound sensor such as a loudspeaker. FIG. 17A shows a sound-controllable multi-function lighting system 1700, which includes the remote control device 1000, equipped with an antenna 1702, and programmed with Bluetooth® software, a powered speaker 1704 equipped with an internal Bluetooth® receiving device (not shown), and the controller 110 configured with the sound-enhanced control circuit 300, containing a microphone 1708.

Operation of the sound-controllable multi-function lighting system 1700 entails a user of the remote control device 1000 or smart phone 1400 engaging the Bluetooth® software to establish a short-range wireless Bluetooth® communication channel 1706 between the antenna 1702 and the speaker 1704. The user selects a sound track (e.g., a musical piece or song), and communicates the soundtrack to the speaker 1704 via the wireless Bluetooth® communication channel 1706. The sound track can be selected, for example, from a user's digital music library that can be stored on the smart phone 1400. Alternatively, the sound track can be selected from a list presented on a Web page. In response, the speaker 1704 broadcasts the received soundtrack. If the controller 110, containing control circuit 300, is located in the general vicinity of the speaker, the microphone 1708 can detect the broadcast soundtrack and modulate the output signal 308 to the lights in response to the pitches and rhythms of the music on the soundtrack. Some embodiments can use a WiFi® communication link in place of Bluetooth®, for longer range wireless communication. The speaker option can be added to any of the different commercial embodiment packages described above.

In another exemplary embodiment, sensors 220 can include devices that are adapted to sense environmental conditions such as temperature, humidity, barometric pressure, and the like, and act as feedback control mechanisms. Such devices can be, for example, micro-electromechanical (MEMS) devices. Incorporating such devices would allow a user to then program the controller 110 to associate the sensed conditions with certain electronic parameters, and to vary power delivery to the receptacles 102, 104, and 106 based on real-time values of such parameters, or on a time trend of such parameters. For example, in an illustrative embodiment, the color of lights illuminated within a particular light array, or the particular array activated, could vary so as to produce blue light in response to sensing a cold ambient temperature, to yellow light, indicating warm, to red light, indicating hot, either at discrete levels or along a color continuum. Such a scheme could be coded into a mobile computing application (e.g., an "app" for a smart phone, a tablet computer, a laptop computer, or a cell phone) and downloaded remotely from a wireless network such as the Internet. Parameters such as, for example, the frequency with which the colors of the lights change in response to a new set of temperature data, can be user-specified via the mobile application.

Figure 18:
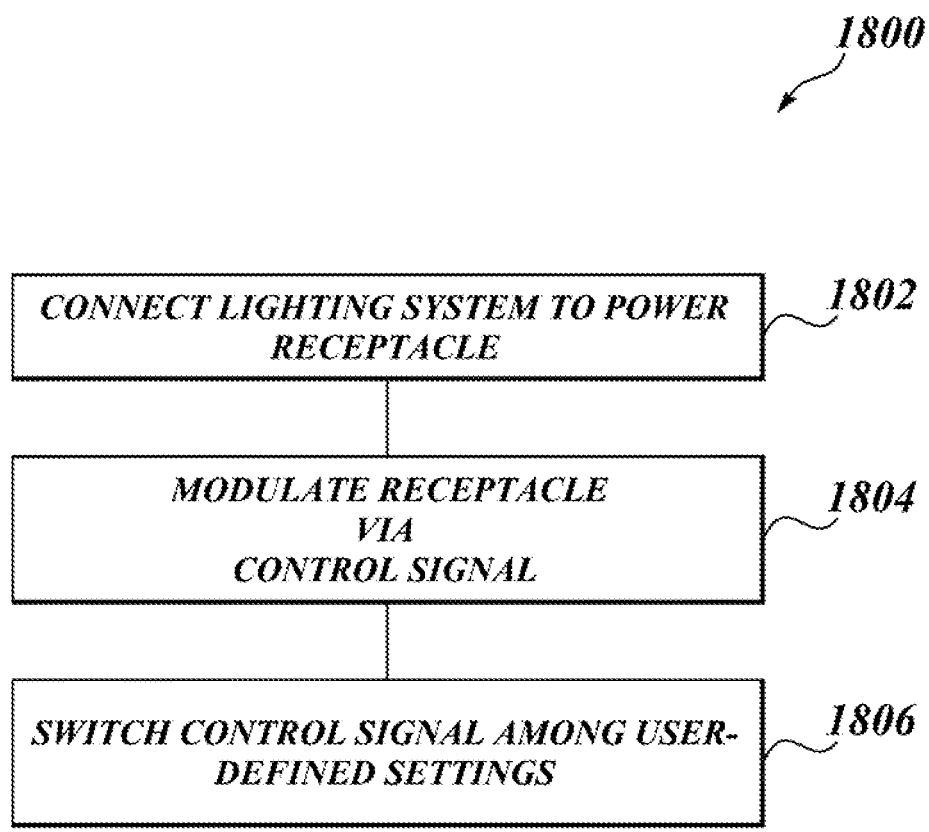
FIG. 18 is a flow diagram showing steps of a method disclosed.

FIG. 18 depicts a sequence of steps in a method 1800 of controlling a supply of electric power to a lighting system comprising multiple light arrays. The method 1800 allows for end-user control of the multiple independent light arrays, including remote control of multiple lighting functions. In step 1802, a lighting system is connected to a receptacle. In step 1804, the receptacle is modulated by a control signal. In step 1806, the control signal can be switched among one or more user-defined settings, allowing the end user of the lighting system to drive the overall lighting display.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    connecting each of a plurality of segments of spatially localized lamps of a multi-circuit lighting system to a current supply wire;
    modulating, via respective control signals, power supplied to each of the plurality of segments of spatially localized lamps to independently energize each of the plurality of segments; and
    switching the control signals among a plurality of different user-defined settings, wherein the switching is activated by a remote control device, and the remote control device transmits a wireless signal including one or more of an infrared signal, a radio frequency signal, or a microwave signal.

2. The method according to claim 1, wherein the plurality of different user-defined settings cause the multi-circuit lighting system to produce decorative lighting effects including one or more of flashing, fading, color changing, twinkling, stacking, cascading, chasing, or combinations thereof.

3. The method according to claim 1, wherein the switching entails manually turning a selector to one of the plurality of different user-defined settings.

4. The method according to claim 1, wherein the remote control device includes one or more of a mobile computing device, a mobile communications device, or a timing device.

5. A multi-function lighting display apparatus, comprising:
    a light array comprising a plurality of segments, each of the plurality of segments joining a group of spatially localized lamps and in operation receives an independent control signal which independently energizes the segment;
    a current supply wire electrically coupled to each of the plurality of segments to supply current to each of the plurality of segments; and
    a controller electrically coupled to each of the plurality of segments via respective switches, in operation the controller provides the control signals independently to each of the plurality of segments via the switches according to instructions provided by a user, wherein each of the control signals controls power supplied to the respective segment via one of the respective switches, the switches being equipped with a sensor which receives a remote control signal, and the switches are activated by the remote control signal.

6. The apparatus according to claim 5, wherein each of the switches is a mechanical selector, including one or more of a push-button, a toggle switch, a rotary knob, or a dial.

7. The apparatus according to claim 5, wherein the remote control signal is wireless signal, including one or more of an infrared signal, a radio frequency signal, or a microwave signal.

8. The apparatus according to claim 5, further comprising a programmable remote control device including one or more of a mobile computing device or a mobile communications device.

9. The apparatus of claim 8, further comprising:
    a powered speaker equipped with a wireless receiver; and
    a sound-enhanced control circuit within the controller, the sound-enhanced control circuit including a microphone that is responsive to transmissions from the speaker, to influence the control signal.

10. The apparatus according to claim 8, wherein the programmable remote control device is a smart phone configured to execute a smart phone application program that allows the user to interactively select features of the multi-function lighting display apparatus.

11. The apparatus according to claim 5, wherein the control signals provided by the controller cause the plurality of segments of the light array to produce different lighting effects, separately or in coordination.

12. The apparatus according to claim 11, wherein the lighting effects include one or more of flashing, fading, color changing, twinkling, stacking, cascading, or chasing.

13. The apparatus according to claim 11, wherein the instructions provided by the user include changing characteristics of the lighting effects, the characteristics including intensity, flashing frequency, chasing speed, stacking speed, chasing direction, cascading speed, cascading direction, color changing parameters, fading rate, rhythmic variations, or combinations thereof.

* * * * *